ized Image

(12) United States Patent
Okamoto et al.

(10) Patent No.: US 7,848,200 B2
(45) Date of Patent: Dec. 7, 2010

(54) METHOD AND APPARATUS OF REPRODUCING MULTILEVEL INFORMATION

(75) Inventors: Kaoru Okamoto, Tokyo (JP); Jun Sumioka, Kawasaki (JP); Masakuni Yamamoto, Yamato (JP)

(73) Assignee: Canon Kabushiki Kaisha, Tokyo (JP)

( * ) Notice: Subject to any disclaimer, the term of this patent is extended or adjusted under 35 U.S.C. 154(b) by 951 days.

(21) Appl. No.: 11/624,862

(22) Filed: Jan. 19, 2007

(65) Prior Publication Data

US 2007/0171800 A1 Jul. 26, 2007

(30) Foreign Application Priority Data

Jan. 26, 2006 (JP) ............................. 2006-017609
Apr. 14, 2006 (JP) ............................. 2006-112237
Jan. 15, 2007 (JP) ............................. 2007-005580

(51) Int. Cl.
*G11B 20/10* (2006.01)
*G11B 27/36* (2006.01)
*G11B 5/09* (2006.01)

(52) U.S. Cl. ................. 369/59.1; 369/59.17; 369/59.23
(58) Field of Classification Search ....................... None
See application file for complete search history.

(56) References Cited

U.S. PATENT DOCUMENTS

| 5,555,231 | A | 9/1996 | Yamamoto | |
|---|---|---|---|---|
| 6,370,097 | B1 * | 4/2002 | Hayashi et al. | 369/59.11 |
| 2004/0145984 | A1 * | 7/2004 | Kadokawa et al. | 369/47.35 |
| 2005/0213462 | A1 * | 9/2005 | Maegawa | 369/59.11 |
| 2006/0109769 | A1 | 5/2006 | Yamamoto et al. | |
| 2006/0280069 | A1 | 12/2006 | Yamamoto et al. | 369/47.1 |
| 2007/0025217 | A1 | 2/2007 | Miyaoka et al. | 369/53.34 |
| 2007/0064544 | A1 | 3/2007 | Okamoto | 369/13.33 |
| 2007/0091759 | A1 | 4/2007 | Yamamoto et al. | 369/59.11 |
| 2007/0171800 | A1 | 7/2007 | Okamoto et al. | 369/59.1 |
| 2007/0177478 | A1 | 8/2007 | Sumioka et al. | 369/59.15 |

FOREIGN PATENT DOCUMENTS

| JP | 5-128530 | 5/1993 |
|---|---|---|
| JP | 2005-047198 | 2/2005 |
| JP | 2006-147077 | 6/2006 |
| JP | 2006-236441 | 9/2006 |

OTHER PUBLICATIONS

Sasa, et al., "Write-Once Disks for Multi-level Optical Recording," ISOM 2003, Proceedings Fr-Po-04, 2003.

* cited by examiner

*Primary Examiner*—Wayne R Young
*Assistant Examiner*—Carl Adams
(74) *Attorney, Agent, or Firm*—Fitzpatrick, Cella, Harper & Scinto

(57) ABSTRACT

A method of reproducing multilevel information using a light spot. The multilevel information is recorded by defining virtual cells at regular intervals on tracks of an optical information recording medium and varying sizes of information pits in the cells. The method includes the steps of obtaining cell boundary values, each of the cell boundary values being obtained by performing sampling when the center of the light spot reaches a boundary between adjacent cells, calculating cell boundary value metrics on the basis of the cell boundary values and prestored reference values for the cell boundary values, calculating path metrics on the basis of the cell boundary value metrics, selecting a path metric having a minimum value of the path metrics, and reproducing the multilevel information on the basis of the path metric having the minimum value of the path metrics.

17 Claims, 26 Drawing Sheets

FIG. 10

| (D0,D1,D2) | (L0,L1,L2) |
|---|---|
| (0,0,0) | (0,0,0) |
| (1,0,1) | (0,0,1) |
| (0,1,1) | (0,1,1) |
| (1,1,0) | (0,1,0) |
| (0,1,0) | (1,1,0) |
| (1,1,1) | (1,1,1) |
| (0,0,1) | (1,0,1) |
| (1,0,0) | (1,0,0) |

FIG. 11

| (X,Y,Z) | S1 OR S2 OR S3 |
|---|---|
| (0,0,0) | 0 |
| (0,0,1) | 1 |
| (0,1,0) | 2 |
| (0,1,1) | 3 |
| (1,1,0) | 4 |
| (1,1,1) | 5 |
| (1,0,0) | 6 |
| (1,0,1) | 7 |

| (S1,S2,S3) | (s11,s12,s13) |
|---|---|
| (0,0,0) | (−7,−7,−7) |
| (0,0,2) | (−7,−7,−3) |
| (0,0,4) | (−7,−7,+1) |
| (0,0,6) | (−7,−7,+5) |
| (0,2,0) | (−7,−3,−7) |
| (0,2,2) | (−7,−3,−3) |
| ⋮ | ⋮ |
| (6,4,2) | (+5,+1,−3) |
| (6,4,4) | (+5,+1,+1) |
| (6,4,6) | (+5,+1,+5) |
| (6,6,0) | (+5,+5,−7) |
| (6,6,2) | (+5,+5,−3) |
| (6,6,4) | (+5,+5,+1) |
| (6,6,6) | (+5,+5,+5) |

FIG. 17A

| (CB1,CB2) | (b11,b12) |
|---|---|
| (0,0) | (−7,−7) |
| (0,2) | (−7,−5) |
| (0,4) | (−7,−3) |
| (0,6) | (−7,−1) |
| (0,8) | (−7,+1) |
| (0,10) | (−7,+3) |
| (0,12) | (−7,+5) |
| (0,14) | (−7,+7) |
| (2,0) | (−5,−7) |
| ... | ... |
| (14,2) | (+7,−5) |
| (14,4) | (+7,−3) |
| (14,6) | (+7,−1) |
| (14,8) | (+7,+1) |
| (14,10) | (+7,+3) |
| (14,12) | (+7,+5) |
| (14,14) | (+7,+7) |

FIG. 17B

| (CB1,CB2) | (b21,b22) |
|---|---|
| (0,1) | (−7,−6) |
| (0,3) | (−7,−4) |
| (0,5) | (−7,−2) |
| (0,7) | (−7,0) |
| (0,9) | (−7,+2) |
| (0,11) | (−7,+4) |
| (0,13) | (−7,+6) |
| (0,1) | (−7,−6) |
| (2,3) | (−5,−4) |
| ... | ... |
| (14,1) | (+7,−6) |
| (14,3) | (+7,−4) |
| (14,5) | (+7,−5) |
| (14,7) | (+7,0) |
| (14,9) | (+7,+2) |
| (14,11) | (+7,+4) |
| (14,13) | (+7,+6) |

FIG. 17C

| (CB1,CB2) | (b31,b32) |
|---|---|
| (1,0) | (−6,−7) |
| (1,2) | (−6,−5) |
| (1,4) | (−6,−3) |
| (1,6) | (−6,−1) |
| (1,8) | (−6,+1) |
| (1,10) | (−6,+3) |
| (1,12) | (−6,+5) |
| (1,14) | (−6,+7) |
| (3,0) | (−4,−7) |
| ... | ... |
| (13,2) | (+6,−5) |
| (13,4) | (+6,−3) |
| (13,6) | (+6,−1) |
| (13,8) | (+6,+1) |
| (13,10) | (+6,+3) |
| (13,12) | (+6,+5) |
| (13,14) | (+6,+7) |

FIG. 17D

| (CB1,CB2) | (b41,b42) |
|---|---|
| (1,1) | (−6,−6) |
| (1,3) | (−6,−4) |
| (1,5) | (−6,−2) |
| (1,7) | (−6,0) |
| (1,9) | (−6,+2) |
| (1,11) | (−6,+4) |
| (1,13) | (−6,+6) |
| (1,1) | (−6,−6) |
| (3,3) | (−7,−4) |
| ... | ... |
| (13,1) | (+6,−6) |
| (13,3) | (+6,−4) |
| (13,5) | (+6,−5) |
| (13,7) | (+6,0) |
| (13,9) | (+6,+2) |
| (13,11) | (+6,+4) |
| (13,13) | (+6,+6) |

FIG. 19

| CELL-BOUNDARY VALUE | COMBINATIONS OF MULTILEVEL VALUES OF LEFT AND RIGHT CELLS |
|---|---|
| 00 | (0,0) |
| 01 | (0,1) (1,0) |
| 02 | (0,2) (2,0) (1,1) |
| 03 | (0,3) (3,0) (1,2) (2,1) |
| 04 | (0,4) (4,0) (1,3) (3,1) (2,2) |
| 05 | (0,5) (5,0) (1,4) (4,1) (2,3) (3,2) |
| 06 | (0,6) (6,0) (1,5) (5,1) (2,4) (4,2) (3,3) |
| 07 | (0,7) (7,0) (1,6) (6,1) (2,5) (5,2) (3,4) (4,3) |
| 08 | (1,7) (7,1) (2,6) (6,2) (3,5) (5,3) (4,4) |
| 09 | (2,7) (7,2) (3,6) (6,3) (4,5) (5,4) |
| 10 | (3,7) (7,3) (4,6) (6,4) (5,5) |
| 11 | (4,7) (7,4) (5,6) (6,5) |
| 12 | (5,7) (7,5) (6,6) |
| 13 | (6,7) (7,6) |
| 14 | (7,7) |

| (D0,D1,D2) | (L0,L1,L2) | BRANCH METRIC |
|---|---|---|
| (0,0,0) | (0,0,0) | m00000 |
| (1,0,1) | (0,0,1) | m00101 |
| (0,1,1) | (0,1,1) | m01110 |
| (1,1,0) | (0,1,0) | m01011 |
| (0,1,0) | (1,1,0) | m11001 |
| (1,1,1) | (1,1,1) | m11100 |
| (0,0,1) | (1,0,1) | m10111 |
| (1,0,0) | (1,0,0) | m10010 |

METHOD AND APPARATUS OF REPRODUCING MULTILEVEL INFORMATION

BACKGROUND OF THE INVENTION

1. Field of the Invention

The present invention relates to methods of reproducing multilevel information from information recording media, such as optical disks. More specifically, the present invention relates to a method of processing multilevel data in which the error rate of data can be reduced.

2. Description of the Related Art

Generally, binary digital data is recorded on optical disks, on spiral or concentric tracks in the form of pits defined by projected and recessed portions, formed by embossing or the like (in the case of ROM disks). In other forms of recording, binary digital data is recorded in the form of holes formed on inorganic or organic recording films (in the case of writable disks), or in the form of differences in crystallization states (in the case of phase change disks). When such recorded data is reproduced, tracks are irradiated with laser beams, and differences in the intensity of reflected light or differences in the direction of polarization due to the magnetic Kerr effect are detected to obtain reproduced RF signals. Then, binary data is detected from the reproduced RF signals.

Recently, research and development is focused on increasing the density of recording on optical disks. With techniques for reducing the size of a light spot used for recording and reproducing information, the wavelength of light from a light source is changing from that of red light (650 nm) to that of blue violet (405 nm). Furthermore, the numerical aperture (NA) of an object lens is being increased from 0.6 or 0.65 to 0.85. At the same time, techniques for recording and reproducing multilevel information efficiently without reducing the size of a light spot have also been proposed.

For example, the assignee of this application proposed a method of recording and reproducing multilevel information in Japanese Patent Laid-Open No. 5-128530.

In a recording and reproducing method, multilevel information is recorded on information tracks of an optical information recording medium on the basis of combinations of the widths of information pits in the direction of the tracks and the amounts of shift of the information pits in the direction of the tracks relative to a light spot for reproduction. Furthermore, when the multilevel information recorded in the form of the information pits is reproduced, multilevel information is reproduced on the basis of a correlation between detection signals learned in advance and detection signals obtained from the light spot.

According to a report presented at ISOM 2003 (Writeonce Disks for Multi-level Optical Recording, Proceedings Fr-Po-04), which is an international symposium for researches in the field of optical disks, an optical system with a blue-violet light source (405 nm) and a numerical aperture (NA) of 0.65 is used.

The optical system records and reproduces 8-level multilevel information on and from an optical disk having a track pitch of 0.46 μm. On the optical disk, the width in the direction of the tracks of each virtually defined region for recording one information pit is 0.26 μm. The virtually defined region will hereinafter be referred to as a cell.

When multilevel data is recorded, information that has been converted from binary to 8 levels is recorded in each cell. More specifically, in the case of 8-ary recording, one cell corresponds to 3-bit binary data.

For example, 3-bit binary data and 8-ary levels can have the following relationships:

(0, 0, 0) corresponds to level 0.

(0, 0, 1) corresponds to level 1.

(0, 1, 0) corresponds to level 2.

(0, 1, 1) corresponds to level 3.

(1, 1, 0) corresponds to level 4.

(1, 1, 1) corresponds to level 5.

(1, 0, 0) corresponds to level 6.

(1, 0, 1) corresponds to level 7.

The widths of the information pits corresponding to the eight levels are defined as follows by equally dividing the width of each cell in the direction of the tracks as shown in FIG. 1.

Level 0 is represented by the absence of an information pit.

Level 1 is represented by a width of 2/16 of the cell width.

Level 2 is represented by a width of 4/16 of the cell width.

Level 3 is represented by a width of 6/16 of the cell width.

Level 4 is represented by a width of 8/16 of the cell width.

Level 5 is represented by a width of 10/16 of the cell width.

Level 6 is represented by a width of 12/16 of the cell width.

Level 7 is represented by a width of 14/16 of the cell width.

When information pits defined as described above are recorded randomly and the amounts of light reflected from the information pits are received by a photodetector, the amplitudes of signals reproduced from the information pits are distributed as shown in FIG. 2. The signals are sampled at timings when the center of the light spot comes at the centers of the widths of individual cells in the direction of the tracks.

Furthermore, an output of reproduced signals in the case where level 0 represented by the absence of an information pit is defined as "1", and an output of reproduced signals in the case where information pits of level 7 are successively recorded is defined as "0".

The value of a reproduced signal corresponding to each level has a certain width due to the effect of information pits preceding and succeeding subject information pits (i.e., intersymbol interference).

When the distribution of the amplitudes of reproduced signals overlaps between adjacent levels, it is not possible to achieve separation and detection with a fixed threshold.

According to the report presented in ISOM 2003, learning is executed to read and to store signals reproduced from pit sequences in which the value of a subject information pit and the values of preceding and succeeding information pits are known.

Then, signals reproduced from actual information pits are compared with the recorded values to achieve separation and detection. This serves to overcome the problem of intersymbol interference described above.

The assignee of this application proposed the following method of recording and reproducing multilevel information in Japanese Patent Application No. 2005-047198 as a technique for recording and reproducing multilevel information while suppressing intersymbol interference.

FIG. 3 shows a positional relationship between a light spot and preceding and succeeding cells in a case where a cell-center value is sampled. For example, the track pitch is 0.32 μm, the size of the light spot is 0.405 μm (the wavelength is 405 nm and the NA of an object lens is 0.85), and the size of a cell is 0.2 μM. It is experimentally known that, with these parameters, the cell-center value of the subject cell does not take on the same value when the levels of the preceding and succeeding cells are varied among 0 to 7 and have a certain width due to the effect of intersymbol interference.

The intersymbol interference can be understood intuitively from the fact that the skirts of the light spot on the middle cell partially overlap the left and right cells in FIG. 3. The effect of intersymbol interference increases as the size of the cell becomes smaller relative to the size of the light spot.

FIG. 4 shows a positional relationship at a timing when the light spot has come to a boundary between left and right cells in a case where a cell-boundary value is sampled. Since the size of the light spot is 0.405 μm and the width of two cells is 0.4 μm, most of the light spot is on the left and right cells. That is, the cell-boundary value sampled at the boundary between the left and right cells is not substantially affected from outside, so that the effect of intersymbol interference from outside the left and right cells is small.

FIGS. 5 and 6 are histograms showing the results of simulations of the levels of reproduced signals of cell-center values and cell-boundary values, respectively. The conditions of the simulations are as follows. An optical system has a blue-violet light source (405 nm) and an NA of 0.85, and an optical disk has a track pitch of 0.32 μm. The size of each virtually defined cell for recording one information pit is 0.20 μm, and multilevel data takes on values among 0 to 7.

As shown in FIG. 5, in the case of cell-center values, because of intersymbol interference, the levels of reproduced signals are not separated. In contrast, as shown in FIG. 6, the levels of reproduced signals of cell-boundary values are separated to fifteen values. Japanese Patent Application No. 2005-047198 describes a method of determining multilevel information on the basis of both the levels of reproduced signals of cell-center values and the levels of reproduced signals of cell-boundary values.

In this specification, the levels of reproduced signals of cell-boundary values separated to fifteen values will be referred to as levels 0 to 14 of cell-boundary values. For example, the lowest level of a reproduced signal in FIG. 6 will be referred to as level 0 of a cell-boundary value.

However, when the cell-boundary values are used for detection of multilevel information as described above, the following problems arise.

In optical disks, level variation or amplitude variation could occur due to various factors, such as difference in reflectivity among various types of optical disks or a difference in reproduction frequency characteristics between an inner side and an outer side of a single optical disk, as well as intersymbol interference. Thus, even when the method of separation and detection described above is used, reproduced signals could be detected incorrectly.

Particularly, since the number of levels of cell-boundary values is greater than the number of levels of cell-center values, the signal-to-noise ratio (S/N ratio) of cell-boundary values is more susceptible to the effects of factors other than intersymbol interference compared with that of cell-center values.

SUMMARY OF THE INVENTION

The present invention provides a method of reproducing multilevel information in which multilevel information can be determined more accurately than in the method of separation and detection according to the related art, thereby reducing incorrect detection, so that high-density recording and reproduction of multilevel information is allowed.

According to one aspect of the invention, there is provided a method of reproducing multilevel information using a light spot, the multilevel information being recorded by defining virtual cells at regular intervals on tracks of an optical information recording medium and varying sizes of information pits in the cells. The method includes the steps of obtaining cell boundary values, each of the cell boundary values being obtained by performing sampling when the center of the light spot reaches a boundary between adjacent cells, calculating cell boundary value metrics on the basis of the cell boundary values and prestored reference values for the cell boundary values, and calculating path metrics on the basis of the cell boundary value metrics.

According to another aspect of the invention, an apparatus can reproduce multilevel information using a light spot, the multilevel information being recorded by defining cells at regular intervals on tracks of an optical information recording medium and varying sizes of information pits in the cells. The apparatus comprises an optical head with a photodetector, the optical head producing a light spot, and a multilevel data determining circuit. The multilevel data determining circuit obtains cell boundary values, each of the cell boundary values being obtained by performing sampling when the center of the light spot reaches a boundary between adjacent cells, calculates cell boundary value metrics on the basis of the cell boundary values and prestored reference values for the cell boundary values, and calculates path metrics on the basis of the cell boundary value metrics.

According to still another aspect of the invention, an apparatus can reproduce multilevel information using a light spot, the multilevel information being recorded by defining cells at regular intervals on tracks of an optical information recording medium and varying sizes of information pits in the cells. The apparatus comprises means for obtaining cell boundary values based on a sampling when the center of the light spot reaches a boundary between adjacent cells, means for calculating cell boundary value metrics on the basis of the cell boundary values and prestored reference values for cell boundary values, and means for calculating path metrics on the basis of the cell boundary value metrics.

Further features of the present invention will become apparent from the following description of exemplary embodiments with reference to the attached drawings.

BRIEF DESCRIPTION OF THE DRAWINGS

FIG. 10 is a table showing bit conversion by a mapping circuit in the first embodiment.

FIG. 11 is a table for converting binary data to 8-ary data by the binary-to-multilevel converter circuit in the first embodiment.

FIG. 15 is a table showing an example of reference values used in the cell-center-value-metric calculating circuit.

FIGS. 17A to 17D show tables showing examples of reference values used in the cell-boundary-value-metric calculating circuit.

FIG. 19 is a diagram showing combinations of multilevel values of left and right cells of cell-boundary values.

DESCRIPTION OF THE EMBODIMENTS

Now, a first embodiment of the present invention will be described in detail with reference to the drawings.

Figure 7:
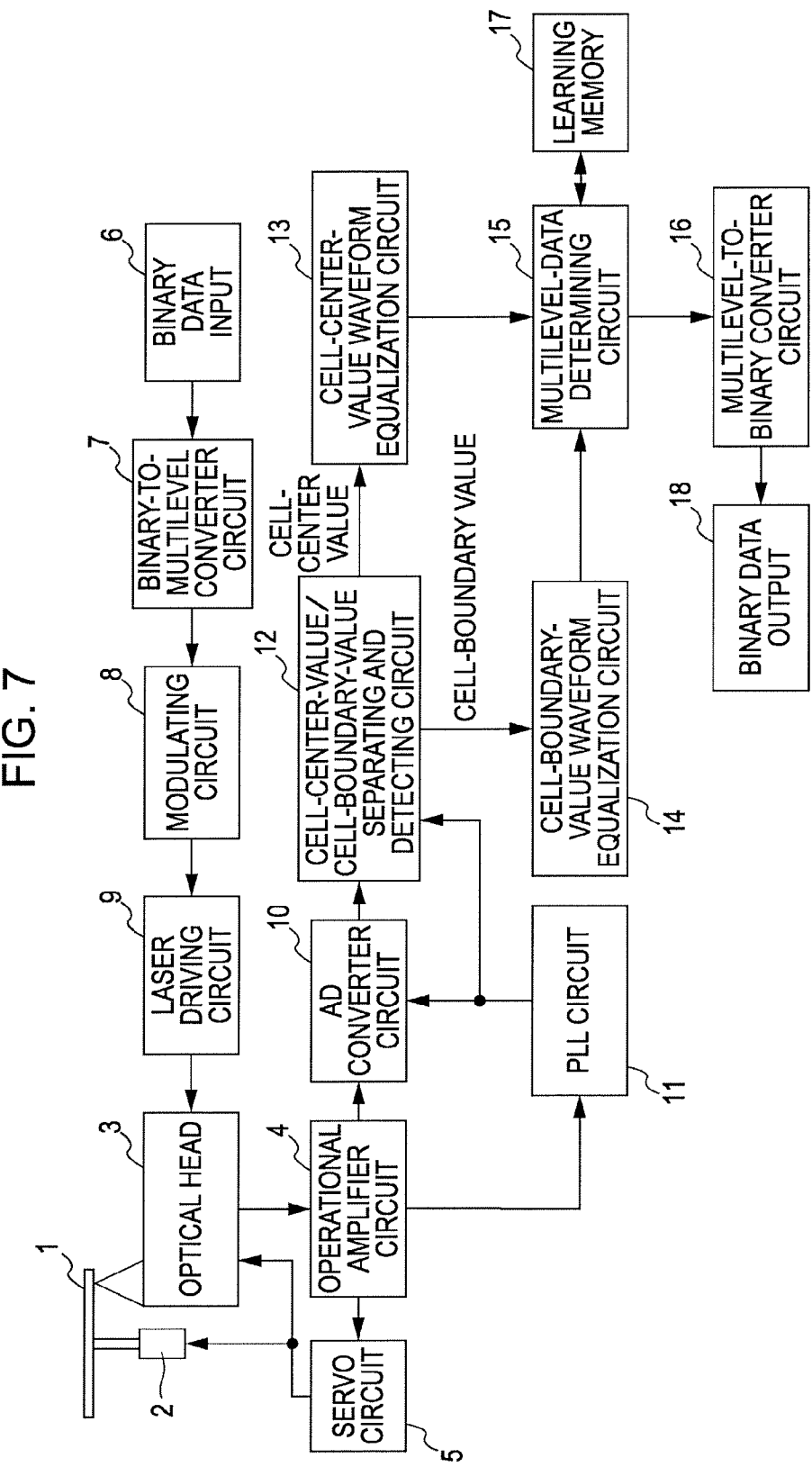
FIG. 7 is a block diagram of an optical disk drive according to a first embodiment of the present invention.

FIG. 7 is a schematic block diagram showing a multilevel-information recording/reproducing apparatus according to the first embodiment.

Referring to FIG. 7, an optical disk 1 has formed thereon spiral or concentric tracks, and a spindle motor 2 drives and rotates the optical disk 1.

Figure 1:
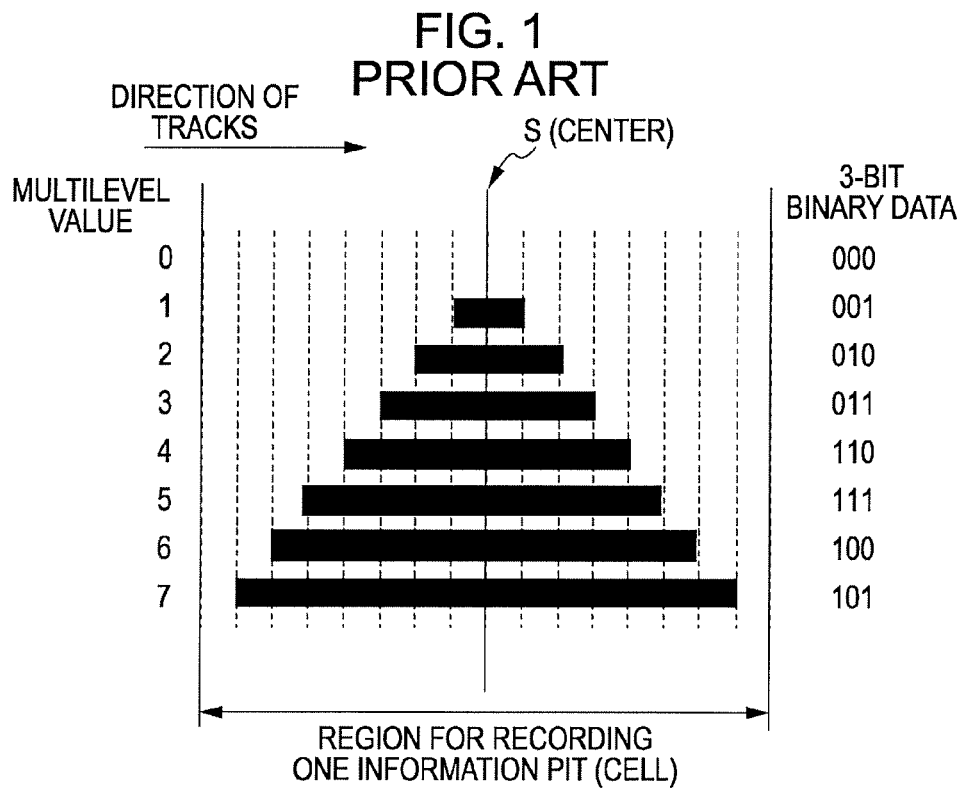
FIG. 1 is a diagram for explaining widths in a direction of tracks and corresponding combinations of 3 bits based on different levels of multilevel information pits.
Figure 2:
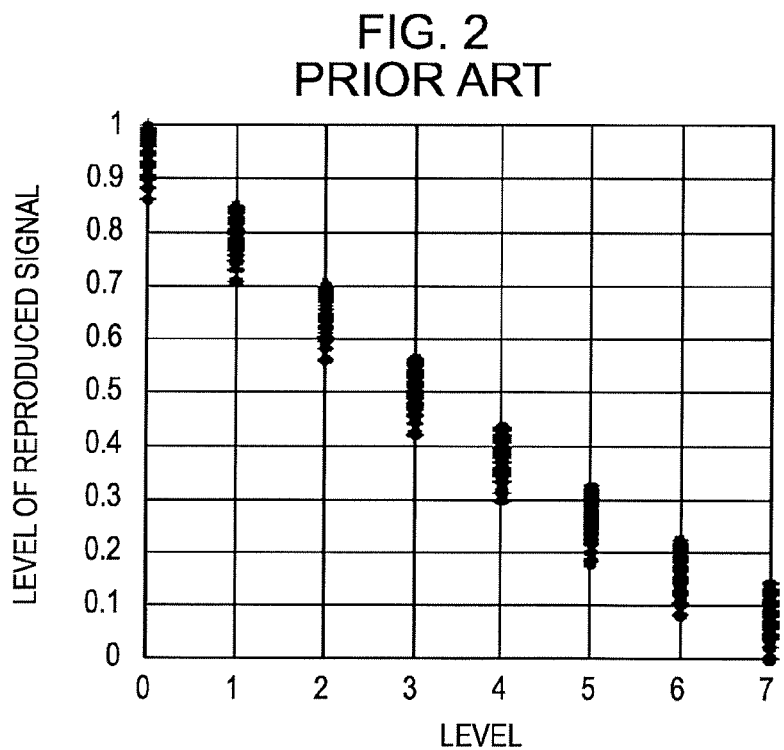
FIG. 2 is a diagram for explaining a distribution of the amplitudes of cell-center values.
Figure 3:
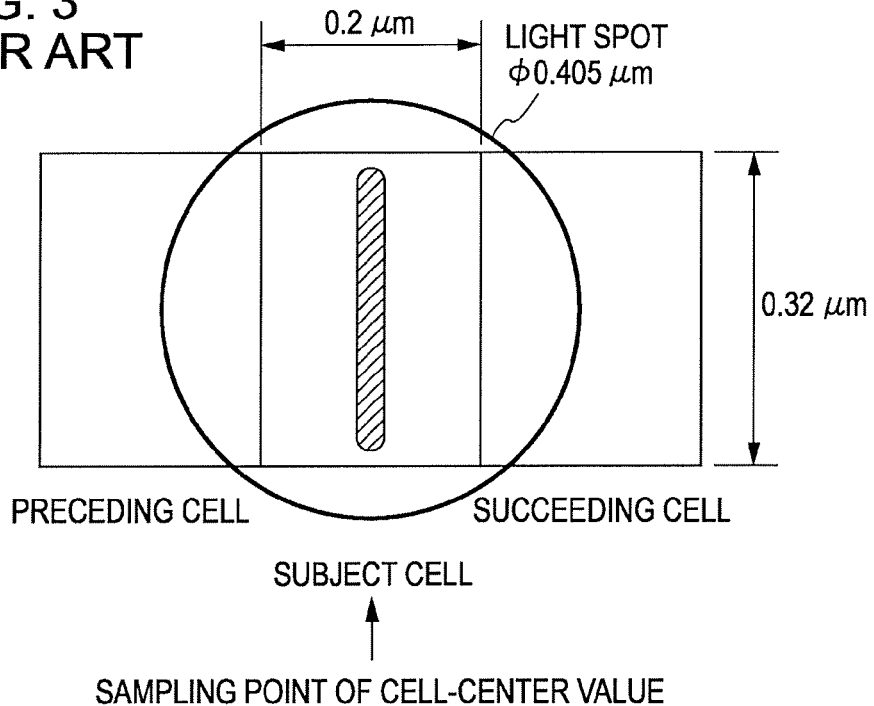
FIG. 3 is a diagram for explaining a positional relationship between preceding and succeeding cells and a light spot in a case where a cell-center value is being sampled.
Figure 4:
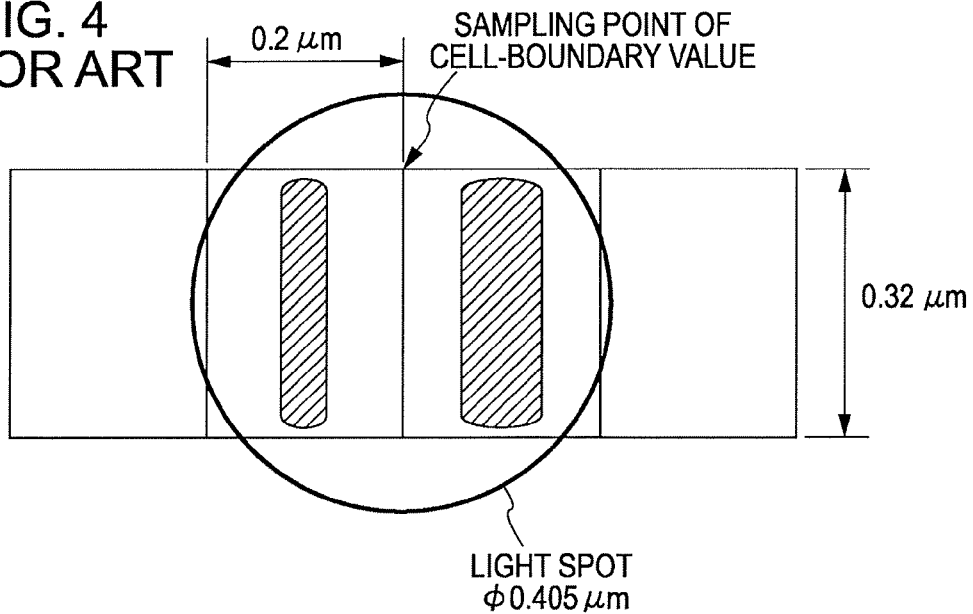
FIG. 4 is a diagram for explaining a positional relationship between preceding and succeeding cells and a light spot in a case where a cell-boundary value is being sampled.
Figure 5:
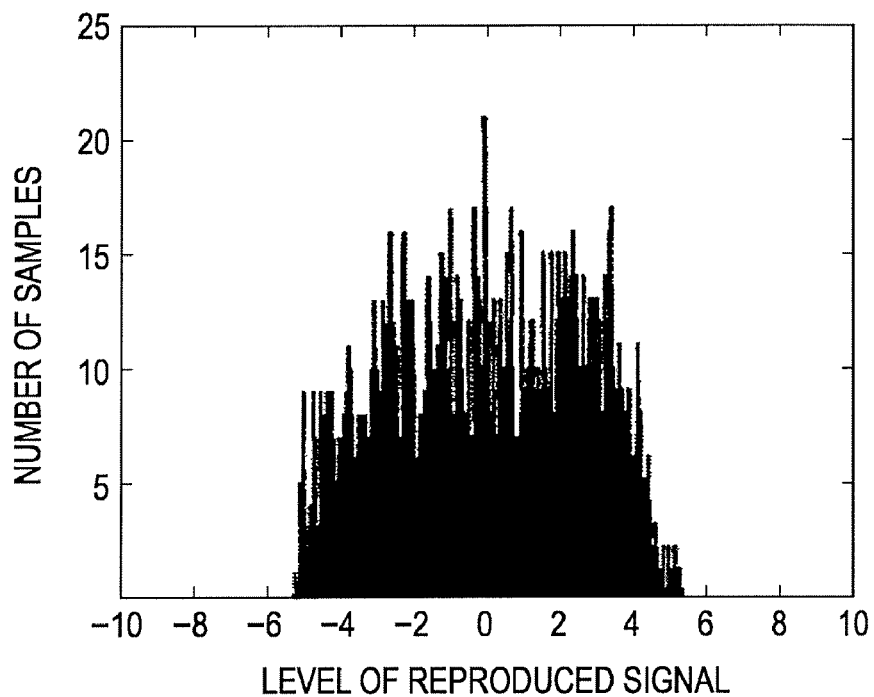
FIG. 5 is a histogram showing results of simulation of the levels of reproduced signals of cell-center values before waveform equalization in a case where 8-ary multilevel data is reproduced.
Figure 6:
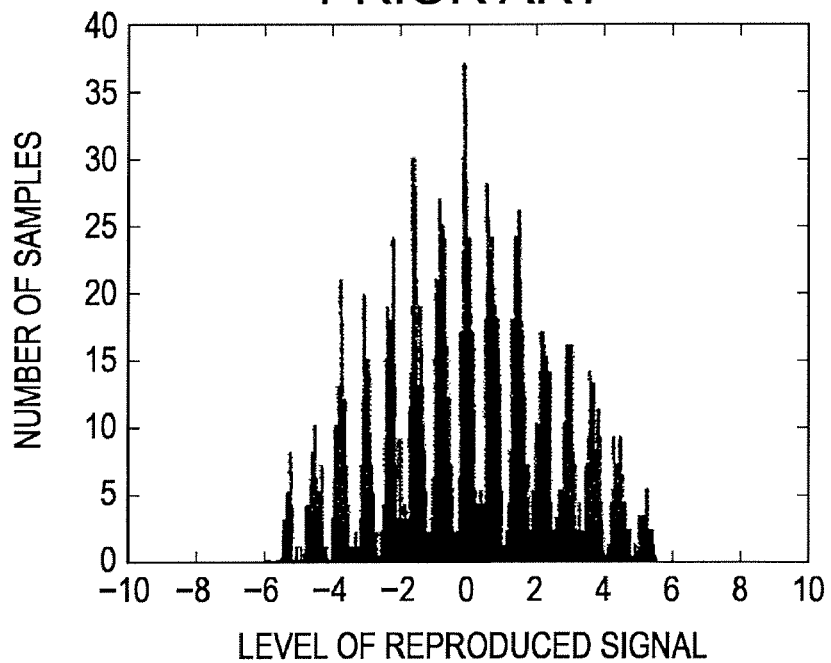
FIG. 6 is a histogram showing results of simulation of the levels of reproduced signals of cell-boundary values before waveform equalization.

The multilevel-information recording/reproducing apparatus records multilevel information on the optical disk 1 by virtually defining cells at regular intervals in the direction of tracks and varying the widths of information pits (or the sizes of information pits) in the cells as described with reference to FIG. 3, or reproduces multilevel information recorded in this manner.

An optical head 3 is used to record multilevel information on the optical disk 1 or to reproduce multilevel information from the optical disk 1. The optical head 3 condenses laser beams emitted from a semiconductor laser of a light source by an object lens, thereby forming a light spot on the optical disk 1. Furthermore, light reflecting from the light spot on the optical disk 1 is detected by a photodetector in the optical head 3, and a corresponding signal is fed to an operational amplifier circuit 4.

The operational amplifier circuit 4 detects a focus-error signal/tracking-error signal.

The focus-error signal/tracking-error signal are signals for exercising control to scan the optical disk 1 with the light spot along a desired track by processing the signal fed from the photodetector of the optical head 3.

A servo circuit 5 controls a focus actuator/tracking actuator in the optical head 3 on the basis of the focus-error signal/tracking-error signal, thereby exercising performing focus control and tracking control.

Furthermore, the servo circuit 5 controls the spindle motor 2 to control rotation of the optical disk 1, for example, in a constant linear velocity mode or a constant angular velocity mode.

When multilevel information is recorded on the optical disk 1, input binary data 6 is converted into multilevel data by a binary-to-multilevel converter circuit 7, and a modulating circuit 8 outputs signals corresponding to the multilevel data.

A laser driving circuit 9 drives the semiconductor laser in the optical head 3 according to the signals, thereby recording marks on the tracks of the optical disk 1 according to the multilevel information.

When multilevel information is reproduced, the optical head 3 irradiates the optical disk 1 to form a light spot for reproduction, and light reflected from the light spot is received by the photodetector. The signals detected are processed by the operational amplifier circuit 4, the resulting signals are converted into digital signals by an AD converter circuit 10, and the digital signals are separated into cell-center values and cell-boundary values by a cell-center-value/cell-boundary-value separating and detecting circuit 12.

These processing steps are executed using a clock generated by a PLL circuit 11. The cell-center values separated by the cell-center-value/cell-boundary-value separating and detecting circuit 12 are fed to a cell-center-value waveform equalization circuit 13, where waveform equalization is executed. The cell-boundary values separated by the cellcenter-value/cell-boundary-value separating and detecting circuit 12 are fed to a cell-boundary-value waveform equalization circuit 14, where waveform equalization is executed. Then, a multilevel-data determining circuit 15 reads reference values for cell-center values and reference values for cell-boundary values from a learning memory 17, where multilevel information learned in advance is recorded.

The reference values for cell-center values in this embodiment refer to values that serve as references for cell-center values of all the combinations (8×8×8=512 combinations) of 8-ary data of successive three cells. This similarly applies to the reference values for cell-boundary values. These reference values will be described in detail below.

The multilevel-data determining circuit 15 determines multilevel values on the basis of the cell-center values and cell-boundary values after waveform equalization, as will be described later. Furthermore, the multilevel values are converted into binary data by a multilevel-to-binary converter circuit 16, which is output as a binary data output 18.

Next, an operation of the binary-to-multilevel converter circuit 7 shown in FIG. 7 in recording multilevel information will be described in detail.

Figure 8A:
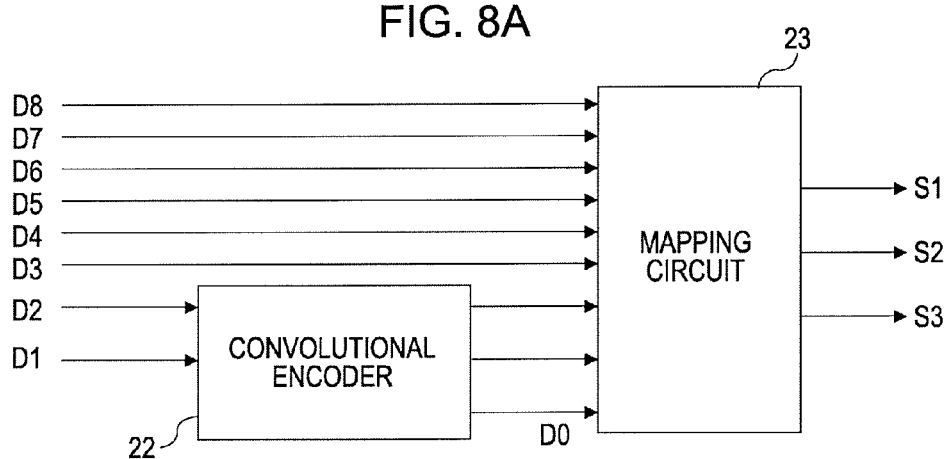
FIGS. 8A and 8B are diagrams showing a binary-to-multilevel converter circuit in the first embodiment.
Figure 8B:
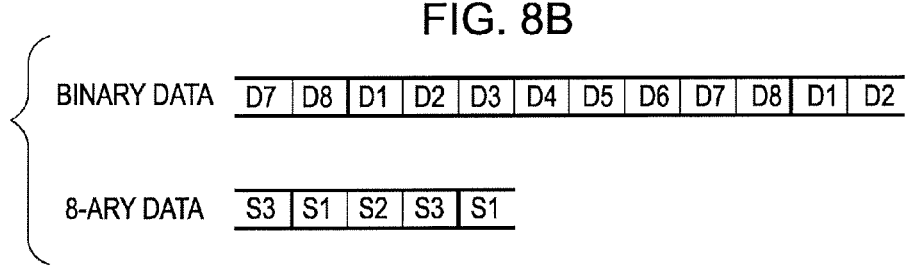

FIGS. 8A and 8B schematically show the binary-to-multilevel converter circuit 7. First, binary data having 8 bits D1 to D8 is converted into 9 bits D0 to D8 by a convolutional encoder 22. The 9 bits D0 to D8 are converted by a mapping circuit 23 into symbols S1, S2, and S3, each of the symbols being 8-ary data that takes on a value among 0 to 7.

Figure 9:
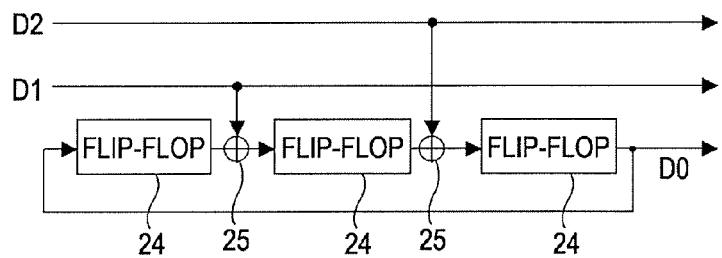
FIG. 9 is a diagram showing a convolutional encoder in the first embodiment.
Figure 12:
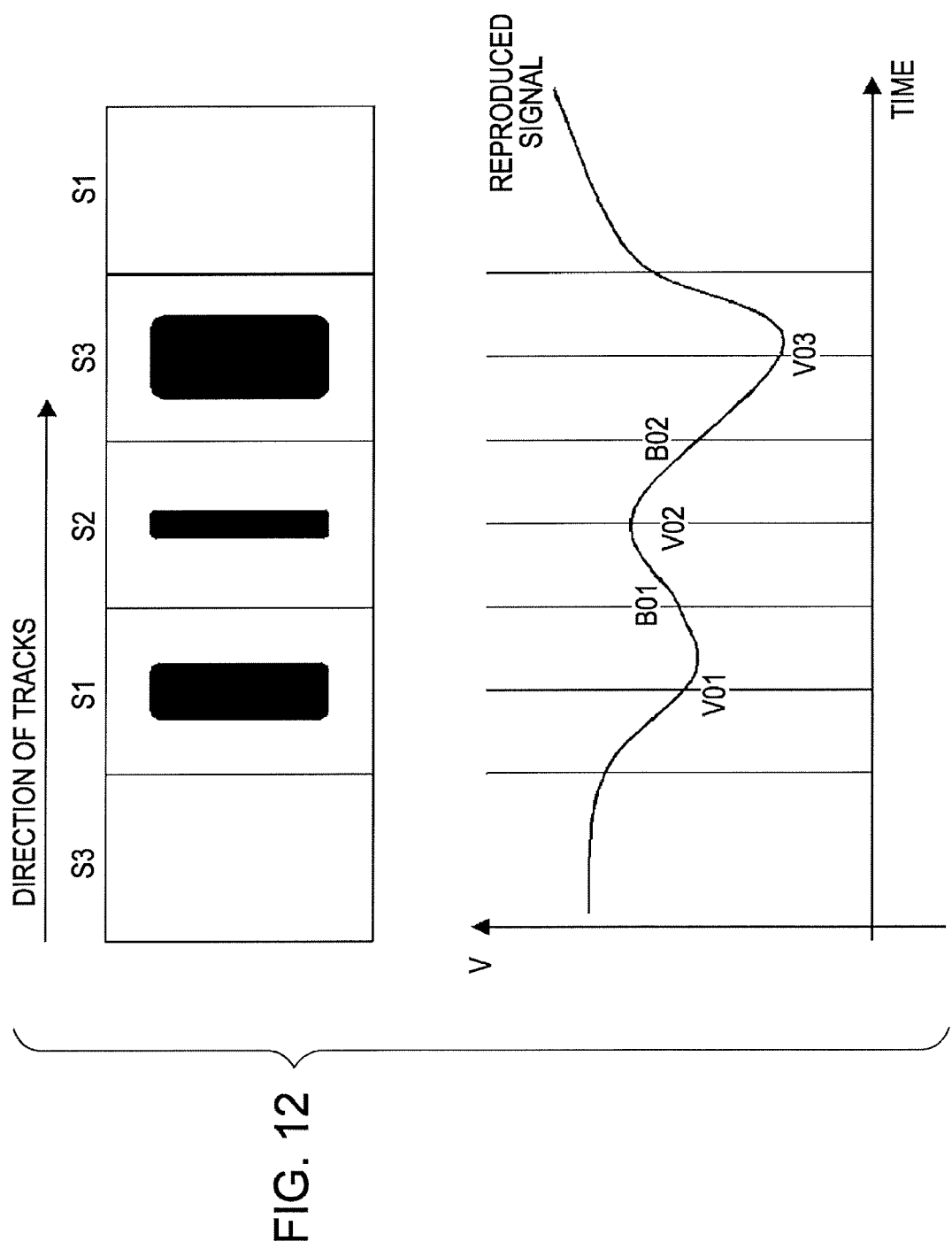
FIG. 12 is a diagram showing sampling points relevant to processing executed by a multilevel-data determining circuit in the first embodiment.

FIG. 9 shows an example of the convolutional encoder 22. The convolutional encoder 22 is formed of three flip-flops 24 and two XOR circuits 25. As shown in FIGS. 8A and 8B, among the 8 bits D1 to D8, the convolutional encoder 22 uses data of only D1 and D2. The convolutional encoder 22 calculates a redundant bit D0 and outputs the redundant bit D0 to the mapping circuit 23.

Next, the mapping circuit 23 will be described.

Of the data D0 to D8 input to the mapping circuit 23, the bits D0, D1, and D2 are converted into bits L0, L1, and L2, as shown in FIG. 10. The bit conversion serves to increase the minimum distance of paths that merge in a trellis diagram described later.

Next, a method of converting binary data L0, L1, L2, D3, D4, . . . , and D8 into 8-ary data S1, S2, and S3 will be described.

First, 9-bit binary data is divided into 3-bit units, such as (X, Y, Z)=(D6, D3, L0), (D7, D4, L1), (D8, D5, L2). Then, the 3-bit binary data (X, Y, Z) is converted into 8-ary data that takes on a value among 0 to 7 according to a table shown in FIG. 11, whereby symbols S1, S2, and S3 are output.

On the basis of the multilevel data obtained in the manner described above, the modulating circuit 8 outputs laser driving pulses for recording the symbols that take on values among 0 to 7, whereby multilevel information is recorded.

Next, an operation of the multilevel-data determining circuit 15 in a reproducing operation will be described in detail with reference to FIGS. 13 to 22.

First, signals input to the multilevel-data determining circuit 15 are processed in units of three cells corresponding to the symbols S1, S2, and S3 in the binary-to-multilevel converter circuit 7. That is, five values, namely, values (V01, V02, V03) obtained by sampling at cell centers and executing waveform equalization and values (B01, B02) obtained by sampling at cell boundaries and executing waveform equalization, are processed.

Figure 13:
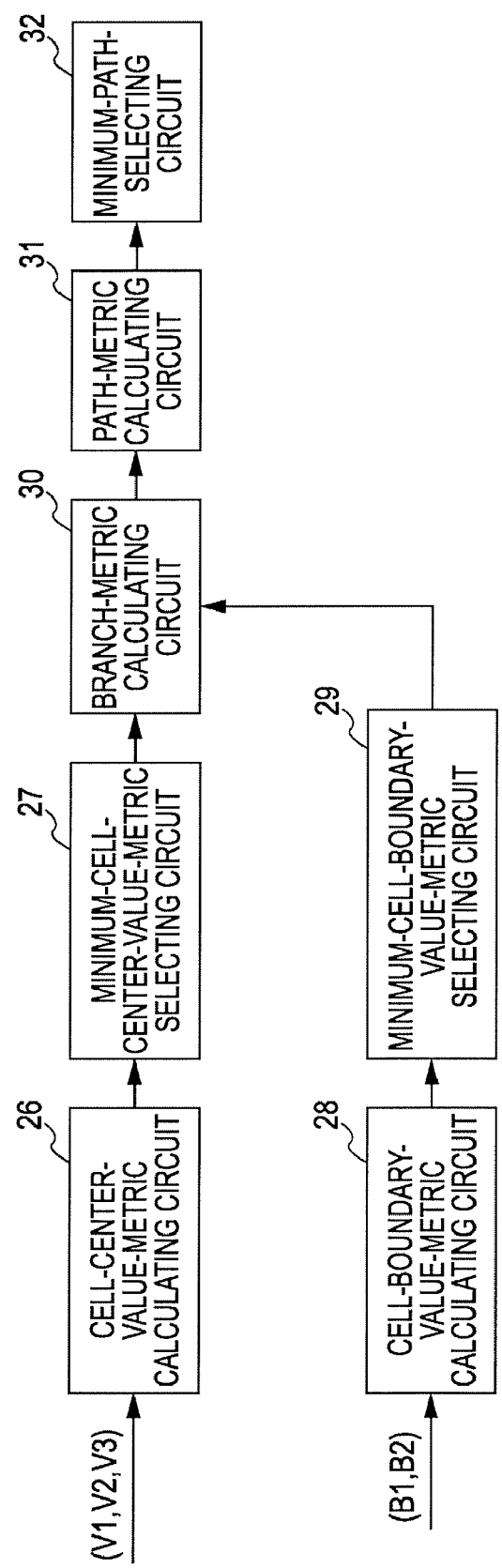
FIG. 13 is a block diagram showing the configuration of the multilevel-data determining circuit in the first embodiment.

FIG. 13 shows the overall configuration of the multilevel-data determining circuit 15. Referring to FIG. 13, a cell-center-value-metric calculating circuit 26 and a cell-boundary-value-metric calculating circuit 28 calculate cell-center-value metrics and cell-boundary-value metrics for the cell-center values (V1, V2, V3) after waveform equalization and for the cell-boundary values after waveform equalization, respectively, using different sets of a plurality of reference values. Then, a minimum-cell-center-value-metric selecting circuit 27 and a minimum-cell-boundary-value-metric selecting circuit 29 select a minimum value for each group having the least significant bits (LSBs) from the cell-center-value metrics and the cell-boundary-value metrics, respectively. Furthermore, a branch-metric calculating circuit 30 calculates branch metrics by adding together the selected minimum-cell-center-value metrics and minimum-cell-boundary-value metrics for the associated cell-center value and cell-boundary value. The association between cell-center values and cell-boundary values will be described later in detail below.

Using the branch metrics calculated in the manner described above, a path-metric calculating circuit 31 calculates path metrics. Finally, a minimum-path-memory selecting circuit 32 selects a most likely path, whereby the multilevel data is decoded.

Next, the individual components of the multilevel-data determining circuit 15 will be described in detail.

Figure 14:
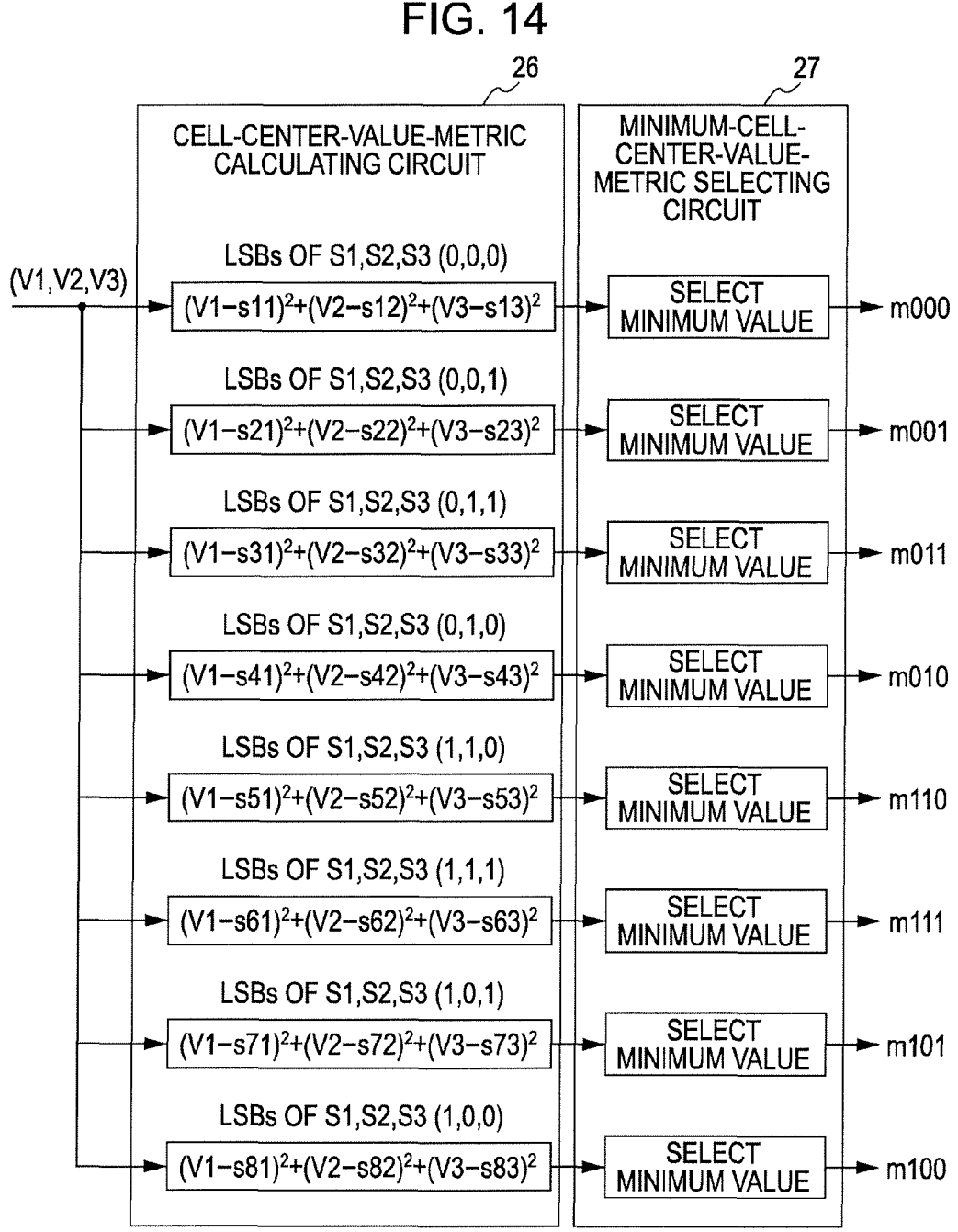
FIG. 14 is a diagram showing a cell-center-value-metric calculating circuit and a minimum-cell-center-value-metric selecting circuit in the first embodiment.

FIG. 14 shows the cell-center-value-metric calculating circuit 26 and the minimum-cell-center-value-metric selecting circuit 27. Regarding the cell-center values (V1, V2, V3) after waveform equalization, eight types of minimum cell-center-value metrics m000, m001, m011, m010, m110, m111, m101, and m100 are calculated correspondingly to all the possible combinations of the LSBs of the multilevel data that is decoded.

For example, in the uppermost calculating circuit of the cell-center-value-metric calculating circuit 26 shown in FIG. 14, it is assumed that the respective least significant bits (LSBs) of S1, S2, and S3 as represented in binary notation (hereinafter abbreviated as the LSBs of S1, S2, and S3) are (0, 0, 0), values with a minimum deviation from reference values are determined. More specifically, there exist 64 combinations of S1, S2, S3, and reference values s11, s12, and s13 for which the LSBs L0, L1, and L2 of S1, S2, and S3 are (0, 0, 0), as shown in FIG. 15. Metrics are calculated for individual cells on the basis of the reference values, and the metrics of the cells are added together, thereby obtaining 64 cell-center-value metrics m, as expressed in equation (1) below. Then, from the cell-center-value metrics m, a minimum cell-center-value metric m000 is selected.

$$m = (V1-s11)^2 + (V2-s12)^2 + (V1-s13)^2 \qquad (1)$$

Furthermore, D0 to D8 are tentatively decoded on the basis of S1, S2, and S3 selected at this time. Since L0, L1, and L2 are (0, 0, 0) in this example, D0, D1, and D2 are (0, 0, 0) according to FIG. 8A, and D3 to D8 are decoded according to FIG. 11 on the basis of higher-order bits of S1, S2, and S3.

Similarly, cell-center-value metrics are calculated according to equation (1) using reference values (s21, s22, s23), (s31, s32, s33), (s41, s42, s43), (s51, s52, s53), (s61, s62, s63), (s71, s72, s73), and (s81, s82, s83) for which L0, L1, and L2 are (0, 0, 1), (0, 1, 1), (0, 1, 0), (1, 1, 0), (1, 1, 1), (1, 0, 1), and (1, 0, 0), respectively. Then, minimum cell-center-value metrics are selected for the individual cases, thereby obtaining m001, m011, m010, m110, m111, m101, and m100.

Figure 16:
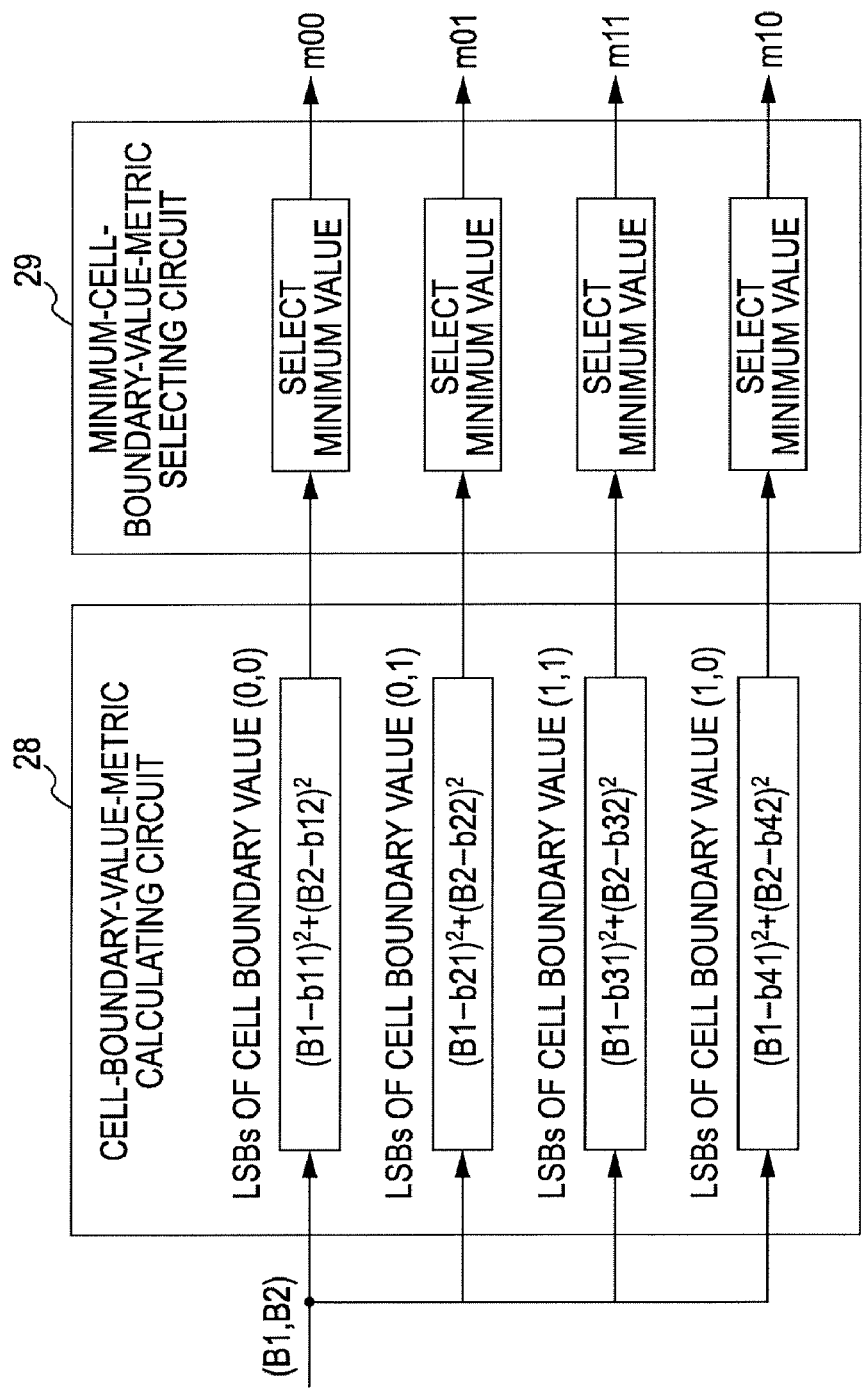
FIG. 16 is a diagram showing a cell-boundary-value-metric calculating circuit and a minimum-cell-boundary-value-metric selecting circuit in the first embodiment.

FIG. 16 shows the cell-boundary-value-metric calculating circuit 28 and the minimum-cell-boundary-value-metric selecting circuit 29.

For the values (B1, B2) obtained by sampling at cell boundaries and executing waveform equalization, four types of minimum cell-boundary-value metrics m00, m01, m11, and m10 are obtained correspondingly to possible combinations of the LSBs of cell-boundary-value data that is decoded.

For example, in the uppermost calculating circuit, it is assumed that the LSBs of cell-boundary values CB1 and CB2 as represented in binary notation (hereinafter abbreviated as the LSBs of cell-boundary values CB1 and CB2) are (0, 0), values with a minimum deviation from reference values are determined. More specifically, as shown in FIG. 17A, there exist 64 combinations of reference values b11 and b12 for which the LSBs of the cell-boundary value CB1 between S1 and S2 and the cell-boundary value CB2 between S2 and S3 are (0, 0). For each of the 64 combinations of reference values, a cell-boundary-value metric mb is calculated according to equation (2) below. Then, a minimum cell-boundary-value metric m00 that is smallest among the cell-boundary-value metrics mb is selected.

$$mb=(B1-b11)^2+(B2-b12)^2 \quad (2)$$

Similarly, referring to FIGS. 17B to 17D, cell-boundary-value metrics are calculated according to equation (2) on the basis of 56 combinations of reference values (b21, b22), 56 combinations of reference values (b31, b32), and 49 combinations of reference values (b41, b42), assuming that the LSBs of the cell-boundary values CB1 and CB2 are (0, 1), (1, 1), and (1, 0), respectively. Then, minimum cell-boundary-value metrics are selected for the individual cases, thereby obtaining m01, m11, and m10.

Next, a method of calculating branch metrics on the basis of the minimum cell-center-value metrics and minimum cell-boundary-value metrics obtained as described above will be described.

Figure 18:
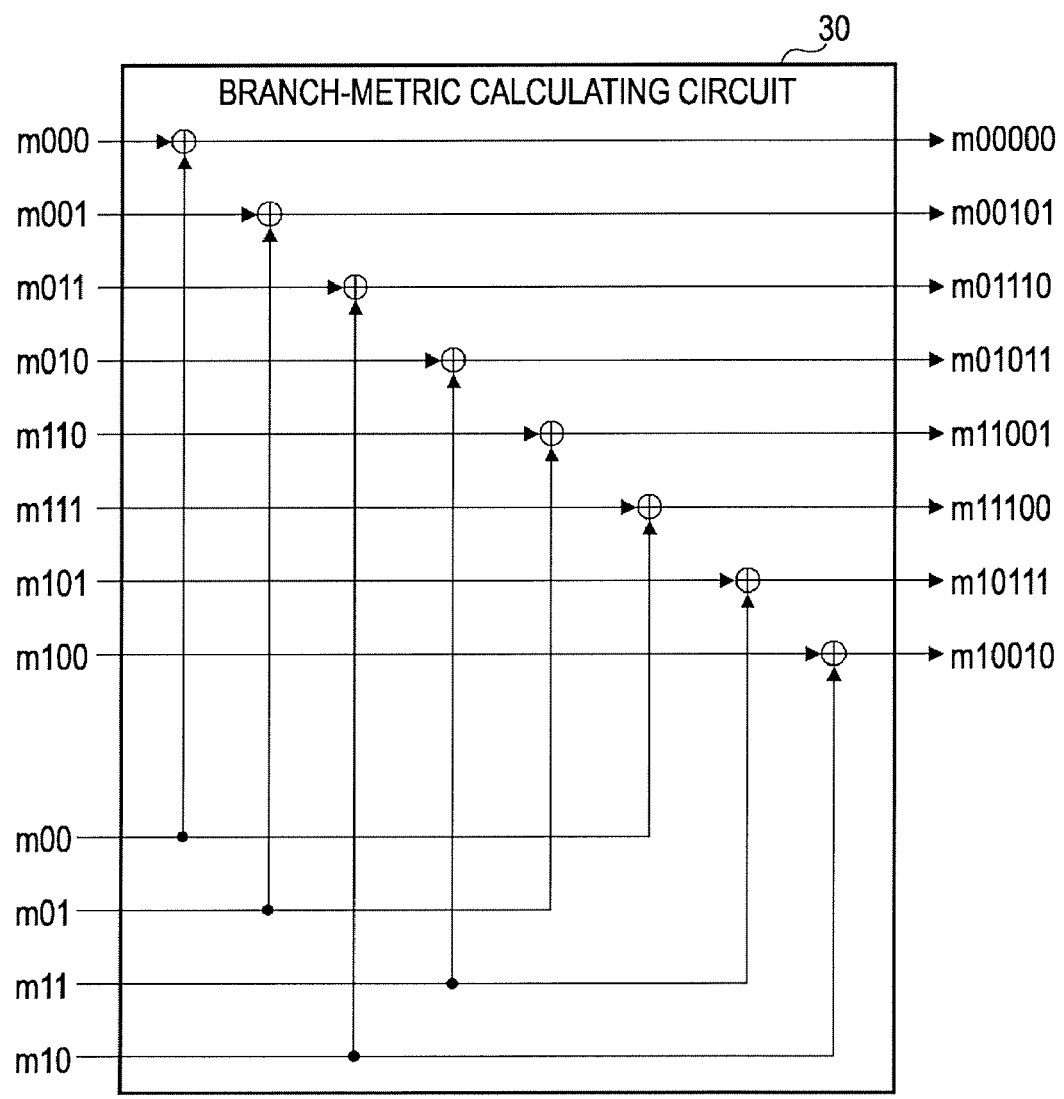
FIG. 18 is a diagram showing a branch-metric calculating circuit in the first embodiment.

Branch metrics are calculated by adding together the minimum cell-center-value metrics m000, m001, m011, m010, m110, m111, m101, and m100 and the minimum cell-boundary-value metrics m00, m01, m11, and m10 by adders in the branch-metric calculating circuit 30 shown in FIG. 18.

More specifically, branch metrics are calculated according to equations (3.1) to (3.8) below:

$$m00000=m000+m00 \quad (3.1)$$

$$m00101=m001+m01 \quad (3.2)$$

$$m01110=m011+m10 \quad (3.3)$$

$$m01011=m010+m11 \quad (3.4)$$

$$m11001=m110+m01 \quad (3.5)$$

$$m11100=m111+m00 \quad (3.6)$$

$$m10111=m101+m11 \quad (3.7)$$

$$m10010=m100+m10 \quad (3.8)$$

FIG. 19 shows the levels of cell-boundary values that are determined by combination combining the multilevel values of two successive cells. The table indicates the following relationships:

When L0, L1, and L2 are (0, 0, 0), the LSBs of the cell-boundary values CB1 and CB2 are (0, 0).

When L0, L1, and L2 are (0, 0, 1), the LSBs of the cell-boundary values CB1 and CB2 are (0, 1).

When L0, L1, and L2 are (0, 1, 1), the LSBs of the cell-boundary values CB1 and CB2 are (1, 0).

When L0, L1, and L2 are (0, 1, 0), the LSBs of the cell-boundary values CB1 and CB2 are (1, 1).

When L0, L1, and L2 are (1, 1, 0), the LSBs of the cell-boundary values CB1 and CB2 are (0, 1).

When L0, L1, and L2 are (1, 1, 1), the LSBs of the cell-boundary values CB1 and CB2 are (0, 0).

When L0, L1, and L2 are (1, 0, 1), the LSBs of the cell-boundary values CB1 and CB2 are (1, 1).

When L0, L1, and L2 are (1, 0, 0), the LSBs of the cell-boundary values CB1 and CB2 are (1, 0).

Thus, the branch-metric calculating circuit 30 calculates branch metrics by the adder circuits shown in FIG. 18, corresponding to equations (3.1) to (3.8).

Next, a path-metric calculating circuit 31 will be described.

Figure 20:
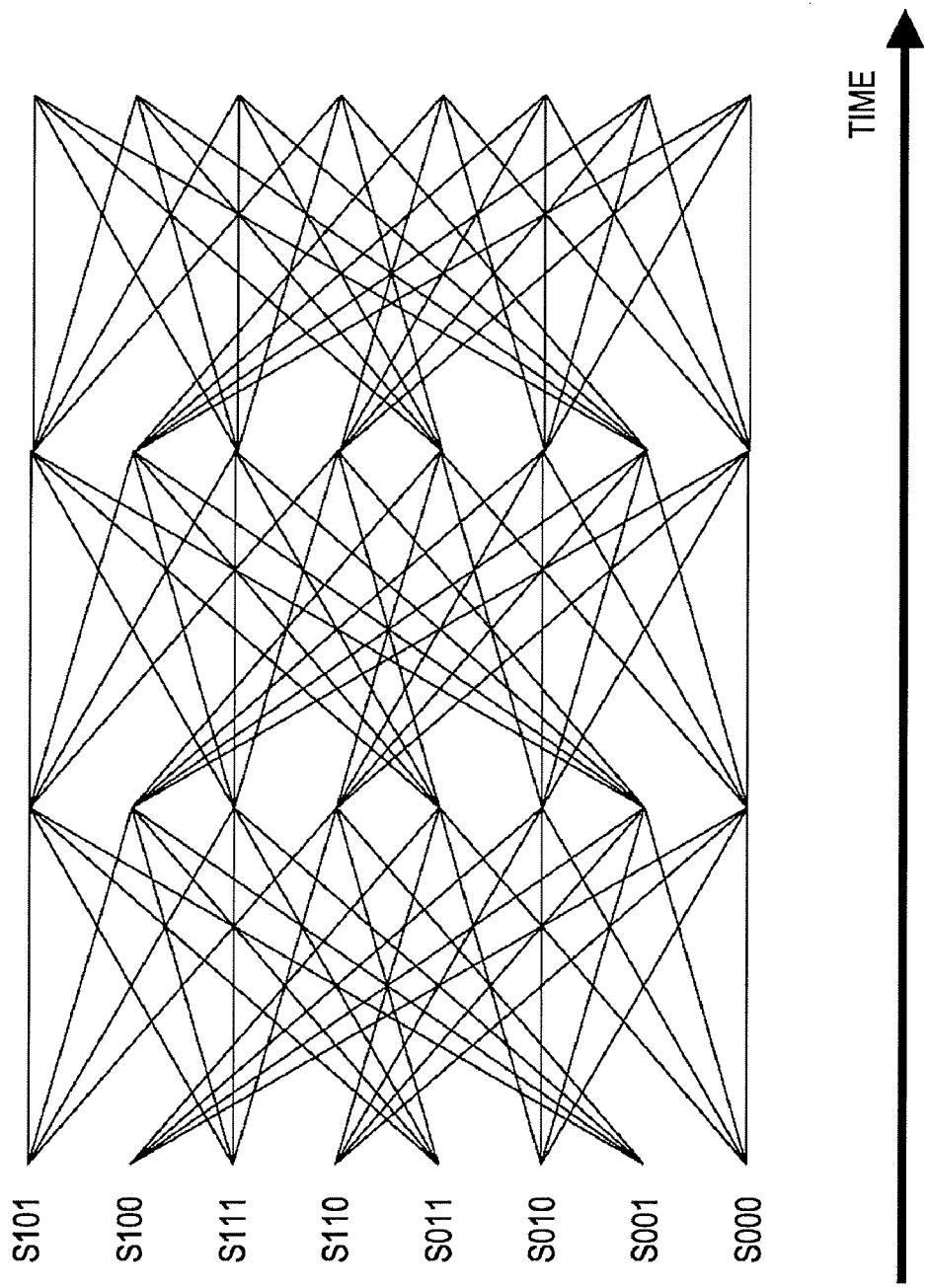
FIG. 20 is a trellis diagram corresponding to a convolutional encoder in the first embodiment.

FIG. 20 is a trellis diagram corresponding to the convolutional encoder shown in FIG. 9. Eight states S000 to S101 are taken correspondingly to the states of the flip-flop 24 shown in FIG. 9, and the states are connected by four restricted paths.

Figures 21, 22:
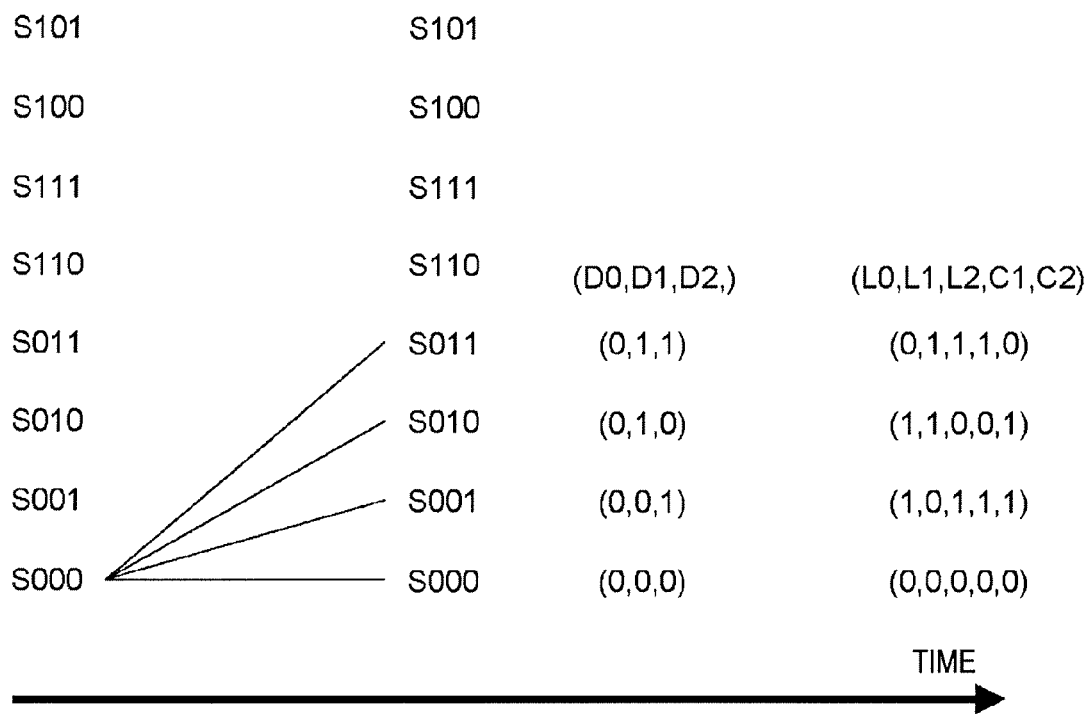
FIG. 21 is a diagram showing an example of a state transition in the trellis diagram corresponding to the convolutional encoder in the first embodiment.
FIG. 22 is a table showing decoded information and associated branch metrics in the first embodiment.

For example, as shown in FIG. 21, considering a state transition from S000, since D0 is 0, paths that can be taken are restricted to four combinations of D1 and D2, i.e., possible transitions are transitions to states S000, S001, S010, and S011. Similarly, when D0 is 1, possible transitions are transitions to states S100, S101, S110, and S111.

Furthermore, branch metrics associated with the paths of (D0, D1, D2) are shown in FIG. 22, which are obtained on the basis of the bit conversion table shown in FIG. 10 and the combinations of cell-boundary values shown in FIG. 19. In Viterbi decoding, path metrics are sequentially calculated while selecting a path having a minimum branch metric among four paths merging to each state.

Finally, the minimum-path-memory selecting circuit 32 selects a path having a minimum value among the path metrics selected. Then, the values D0 to D8 associated with the finally selected path, tentatively decoded by the minimum-cell-center-value-metric selecting circuit 27, are determined as the final result of decoding, whereby the process of reproducing multilevel data is finished.

According to this embodiment, instead of determining multilevel information using only cell-center values sampled at the centers of cells as in the related art, multilevel information is determined using cell-boundary values sampled at cell boundaries as well as cell-center values. Accordingly, incorrect detection is reduced, so that recording and reproduction of multilevel information at a high density is allowed.

Furthermore, by Viterbi-decoding signals that have been modulated by digital multilevel modulation, the effective signal-to-noise ratio of cell-boundary values and cell-center values can be improved, so that the error rate can be reduced.

The embodiment described above may be combined with the method of separation and detection described in the section of the related art.

In the method of separation and detection referred to herein, for example, signals that are reproduced from pit sequences in which a value of a subject information pit and values of preceding and succeeding information pits are known are read and stored. Then, signals reproduced from actual information bits are compared with the recorded values, thereby executing separation and detection.

Furthermore, a Reed-Solomon code, or the like, may be used as an outer code for the purpose of error correction.

Although the embodiment has been described in the context of an example where decoding is executed in units of three virtual cells, without limitation, decoding may be executed in units of any plural number of virtual cells. Furthermore, the error rate can be reduced by increasing the constraint length of the convolutional encoder or by a combination with a Turbo code.

Second Embodiment

Next, a second embodiment of the present invention will be described in detail.

The configuration of the second embodiment is basically the same as that of the first embodiment, so that the following description will be directed to points that differ from the first embodiment.

First, an operation of the binary-to-multilevel converter circuit 7, shown in FIG. 7, in recording multilevel information will be described in detail.

Figure 23:
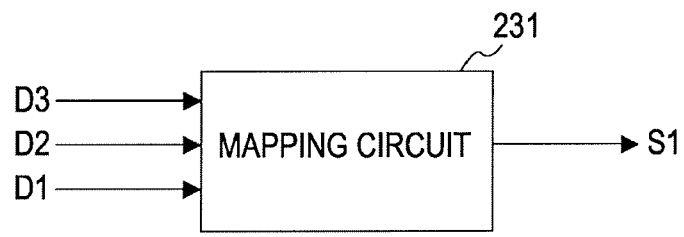
FIG. 23 is a diagram showing a binary-to-multilevel converter circuit in a second embodiment of the present invention.

FIG. 23 is a diagram schematically showing the binary-to-multilevel converter circuit 7. First, binary data having three bits D1 to D3 are converted by a mapping circuit 231 into an 8-ary symbol S1 that takes on a value among 0 to 7. The data D1 to D3 input to the mapping circuit 231 are considered as 3-bit data (X, Y, Z) and converted into 8-ary data that takes on a value among 0 to 7 according to the table shown in FIG. 11, whereby a corresponding symbol S1 is output.

On the basis of the multilevel data obtained in the manner described above, the modulating circuit 8 outputs laser driving pulses for recording symbols of 0 to 7, whereby multilevel information is recorded.

As described earlier, the cell-center values and cell-boundary values of reproduced signals of the recorded multilevel information have the relationships shown in FIG. 19. That is, the level of a cell-boundary value that is determined by a combination of two successive cells is the sum of the levels of two cell-center values.

Figure 24:
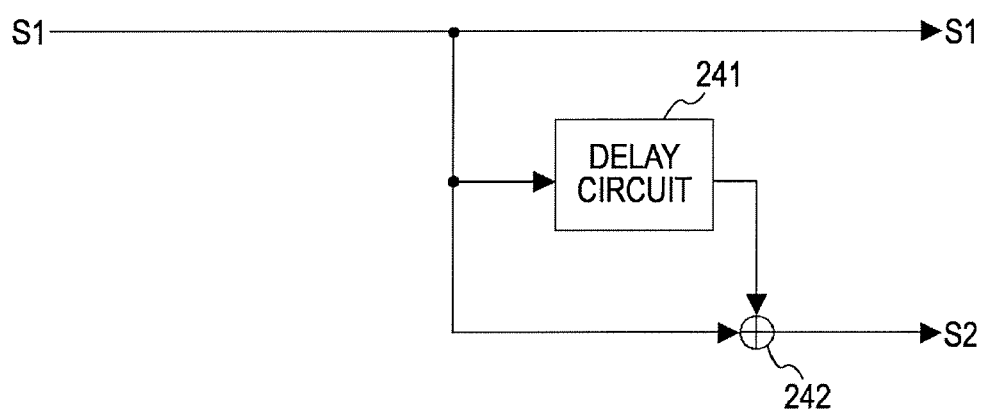
FIG. 24 is a diagram showing the relationship between multilevel values of cell-center values and cell-boundary values in the form of a convolutional encoder.

The relationships between the cell-center values and the cell-boundary values can be attributed to a natural convolutional encoder shown in FIG. 24, which is due to intersymbol interference. In FIG. 24, S1 denotes the level of a cell-center value, and S2 denotes the level of a cell-boundary value. In FIG. 24, reference numeral 241 denotes a delay circuit, and reference numeral 242 denotes an adder circuit.

Next, an operation of the multilevel-data determining circuit 15 in reproducing multilevel information will be described in detail with reference to FIGS. 25 to 31.

Figure 25:
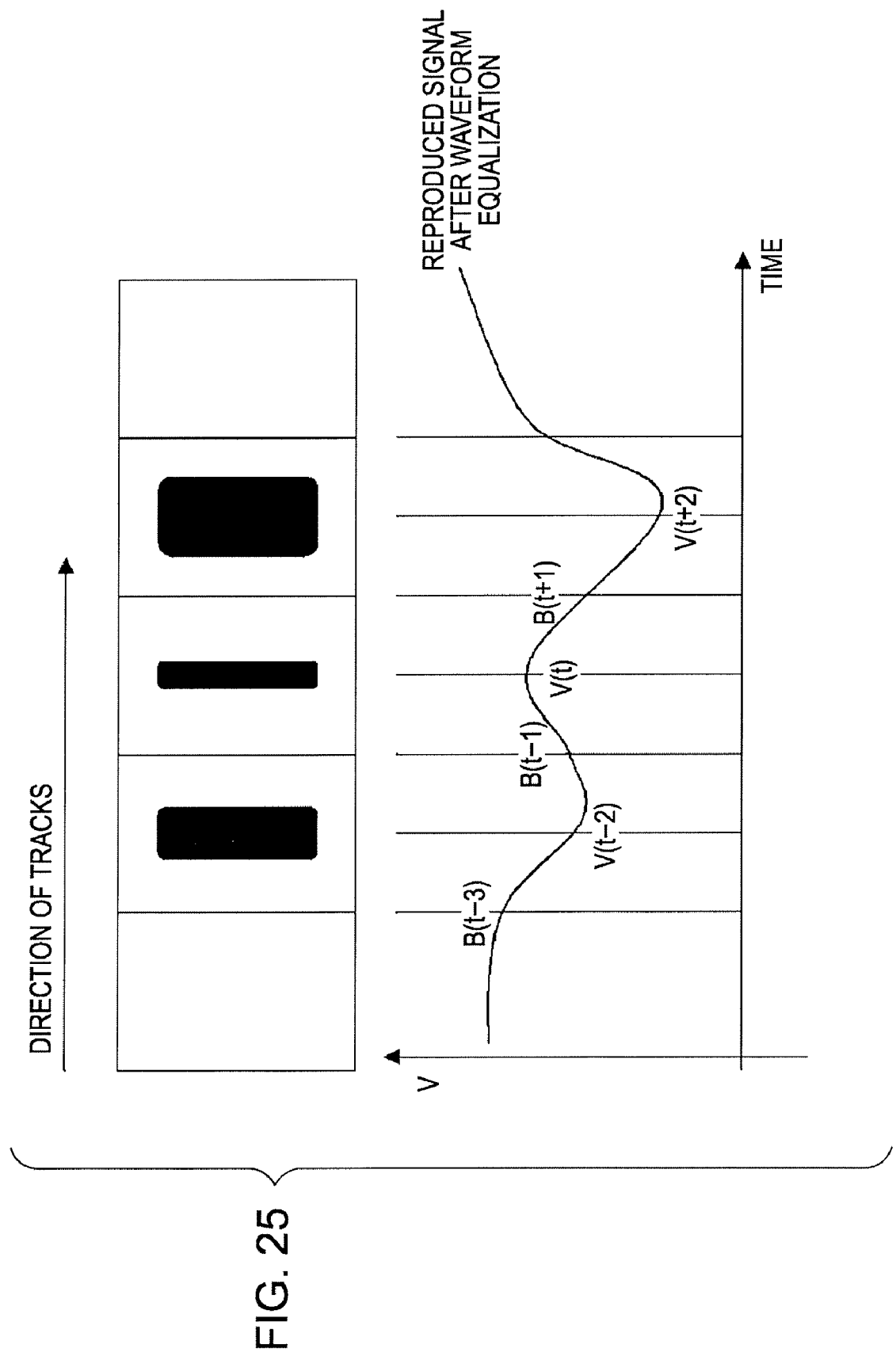
FIG. 25 is a diagram showing sampling points where processing is executed by a multilevel-data determining circuit in the second embodiment.

First, reproduced signals after waveform equalization, input to the multilevel-data determining circuit 15, are processed in units of successive cell-boundary value values and cell-center values, as shown in FIG. 25. That is, a value V(t) sampled at a cell center at time t and a cell-boundary value B(t−1) sampled at time t−1 are processed.

Figure 26:
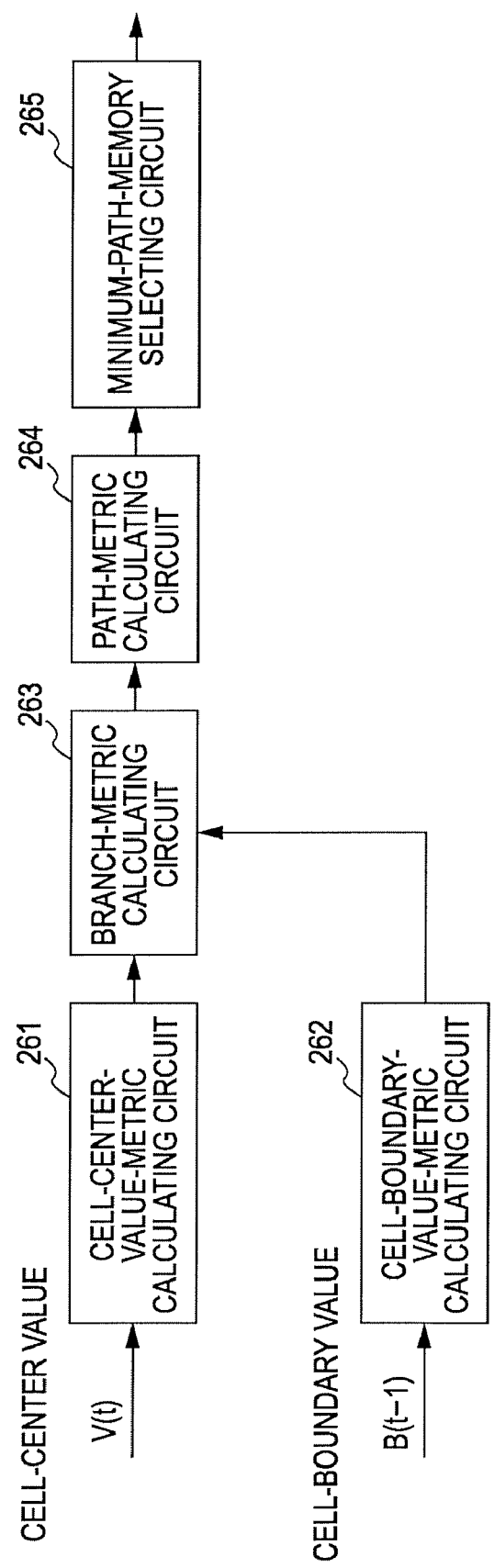
FIG. 26 is a block diagram showing the configuration of the multilevel-data determining circuit in the second embodiment.

FIG. 26 shows the overall configuration of the multilevel-data determining circuit 15. Referring to FIG. 26, the cell-center value V(t) after waveform equalization and the cell-boundary value B(t−1) after waveform equalization are fed to a cell-center-value-metric calculating circuit 261 and a cell-boundary-value-metric calculating circuit 262, respectively, where metrics for these values are calculated. Furthermore, a branch-metric calculating circuit 263 calculates branch metrics by adding metrics of adjacent cell-center values and cell-boundary values.

A path-metric calculating circuit 264 calculates path metrics using the branch metrics calculated as described above. Finally, a minimum-path-memory selecting circuit 265 selects a most likely path, whereby the multilevel data is decoded.

Now, the multilevel-data determining circuit 15 will be described in detail.

In the multilevel-data determining circuit 15, the branch-metric calculating circuit 263 calculates branch metrics according to equation (4) below:

$$\lambda ij(t)=(V(t)-sj)^2+(B(t-1)-bi+j)^2 \quad (4)$$

where $\lambda ij(t)$ denotes a branch metric associated with a transition from state i to state j at time t, sj denotes a reference value for a cell-center value, and bi+j denotes a reference value for a cell-boundary value. In the right-hand side of equation (4), the first term is calculated by the cell-center-value-metric calculating circuit 261, and the second term is calculated by the cell-boundary-value-metric calculating circuit 262.

Then, the path-metric calculating circuit 264 calculates path metrics Lj(t) according to equation (5) below:

$$Lj(t)=\min[Li(t-2)+\lambda ij(t)] \ (i=0 \text{ to } 7) \quad (5)$$

where Lj(t) denotes a path metric of state j at time t. In equation (5), only a minimum value is selected among values obtained with i=0 to 7.

Then, the minimum-path-memory selecting circuit 265 selects a state having the minimum path metric, whereby a most likely path is selected and multilevel data is decoded.

The multilevel data selected in the end is converted into binary data D1 to D3 according to the table shown in FIG. 11, whereby the process of reproducing multilevel data is finished.

The method of processing branch metrics and path metrics described above will be described in detail with reference to FIGS. 27 to 31.

For the purpose of description, it is assumed herein that recorded multilevel data is 4, 1, 0, 6, 7.

Furthermore, it is assumed that data after waveform equalization is as follows:

$V(t-8)=0.8$ $V(t-6)=-6.1$ $V(t-4)=-7.2$ $V(t-2)=4.8$ $V(t)=7.2$ $B(t-7)=-2$ $B(t-5)=-6.1$ $B(t-3)=-1.9$ $B(t-1)=5.8$

Furthermore, it is assumed that the reference values sj for cell-center values are s0=−7, s1=−5, s3=−1, s4=1, s5=3, s6=5, s7=7. Furthermore, it is assumed that the reference values bi+j for cell-boundary values are b0=−7, b1=−6, b2=−5, b3=−4, b4=−3, b5=−2, b6=−1, b7=0, b8=1, b9=2, b10=3, b11=4, b12=5, b13=6, b14=7.

When the cell-center values are decoded by slicing the levels on the basis of the reference values for cell-center values, the multilevel data is decoded as 4, 0, 0, 6, 7, so that the second symbol is incorrect.

Figure 27:
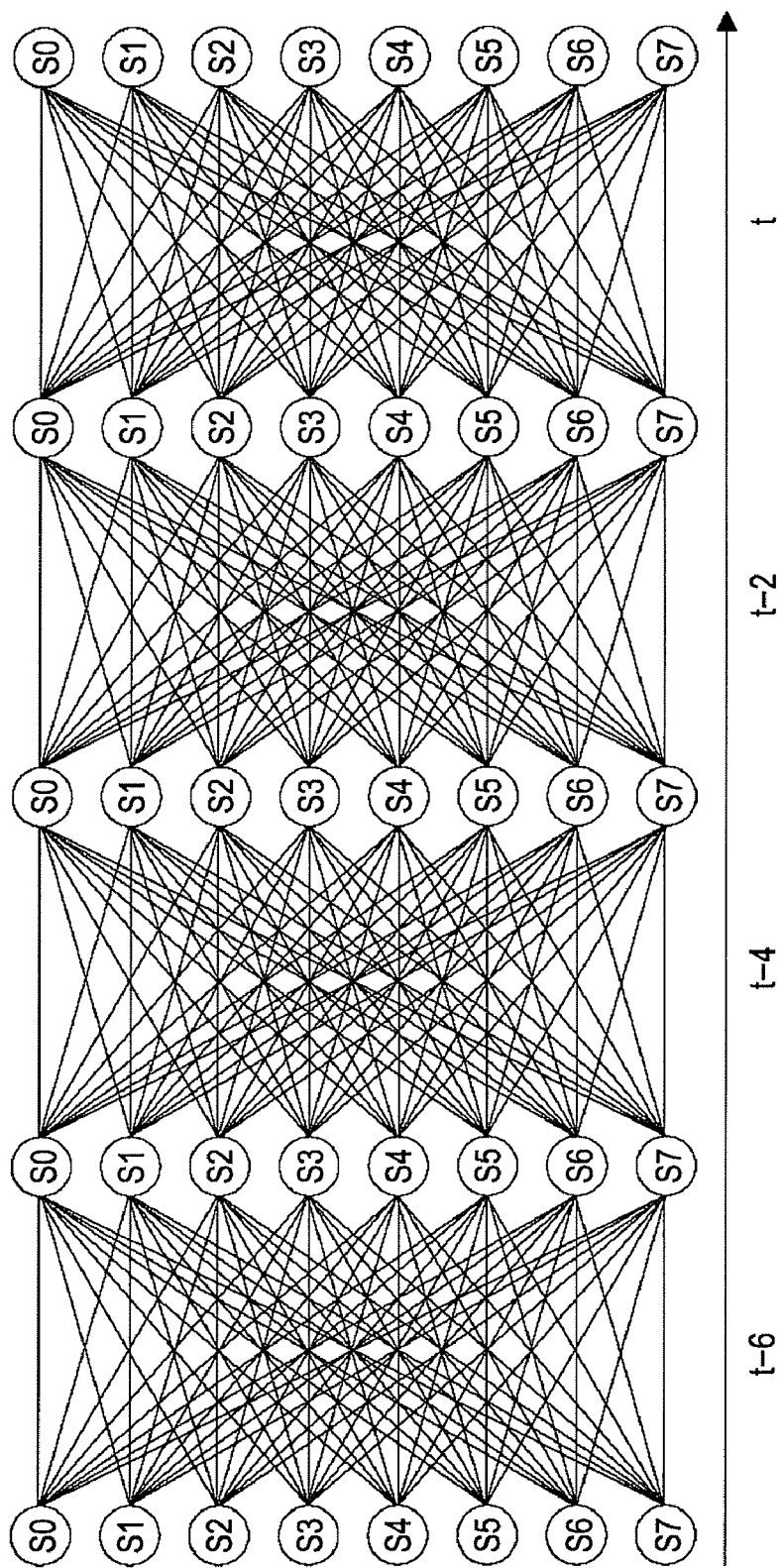
FIG. 27 is a trellis diagram in the second embodiment.

FIG. 27 shows a trellis diagram of eight states in this embodiment. The trellis diagram shown in FIG. 27 corresponds to the convolutional encoder shown in FIG. 9. In the trellis diagram, path metrics are shown in circles.

Branch metrics associated with branches in the trellis diagram are calculated by the cell-center-value-metric calculating circuit 261, the cell-boundary-value-metric calculating circuit 262, and the branch-metric calculating circuit 263.

Figure 28:
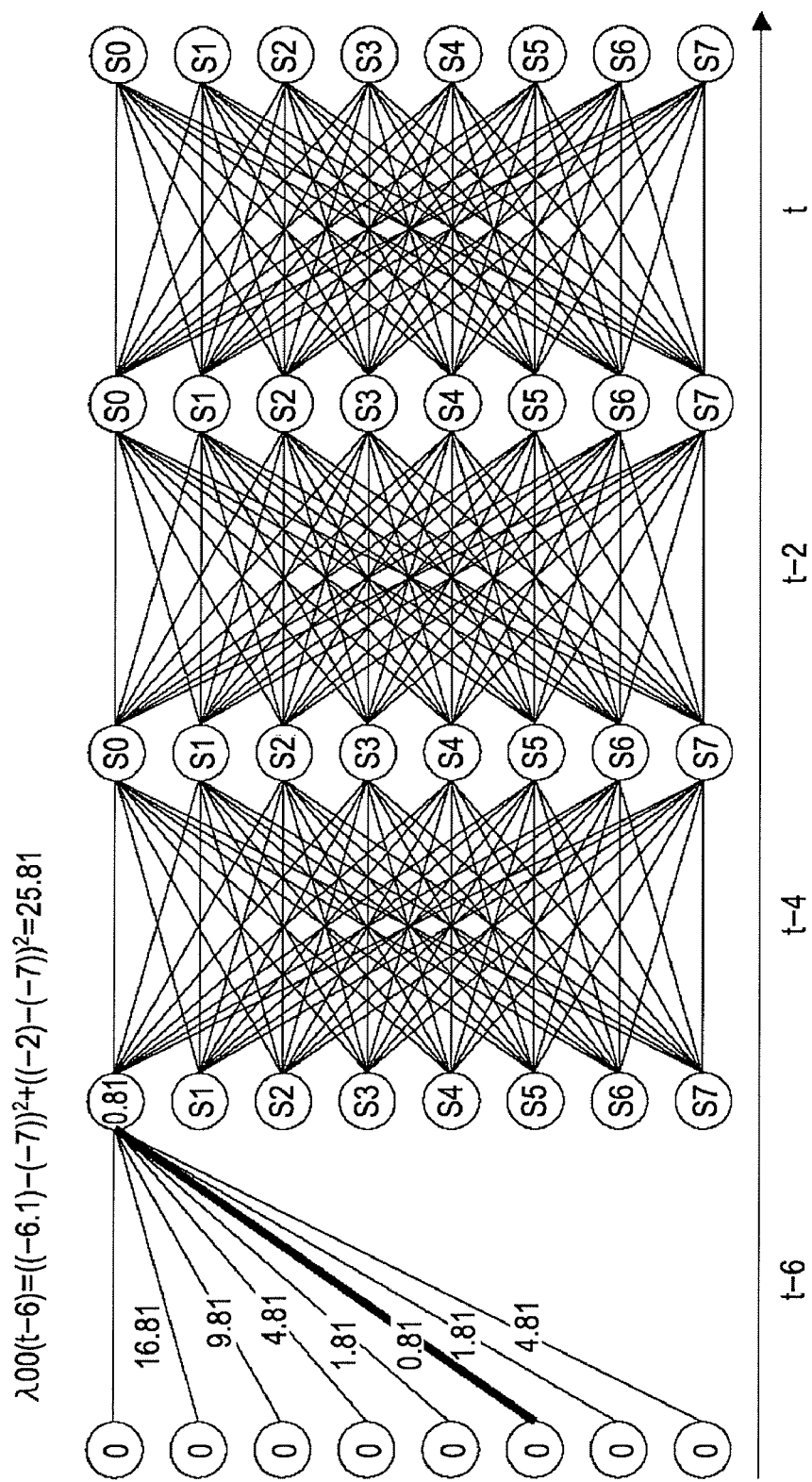
FIG. 28 is a trellis diagram showing results of calculation of branch metrics in the second embodiment.

FIG. 28 shows the method of calculating L0($t$–6) more specifically. First, branch metrics are calculated as follows:

$$\lambda 00(t-6)=(V(t-6)-s0)^2+(B(t-7)-b0)^2=25.81$$

$$\lambda 10(t-6)=(V(t-6)-s0)^2+(B(t-7)-b1)^2=16.81$$

$$\lambda 20(t-6)=(V(t-6)-s0)^2+(B(t-7)-b2)^2=9.81$$

$$\lambda 30(t-6)=(V(t-6)-s0)^2+(B(t-7)-b3)^2=4.81$$

$$\lambda 40(t-6)=(V(t-6)-s0)^2+(B(t-7)-b4)^2=1.81$$

$$\lambda 50(t-6)=(V(t-6)-s_0)^2+(B(t-7)-b5)^2=0.81$$

$$\lambda 60(t-6)=(V(t-6)-s0)^2+(B(t-7)-b6)^2=1.81$$

$$\lambda 70(t-6)=(V(t-6)-s0)^2+(B(t-7)-b7)^2=4.81$$

Other $\lambda ij(t-6)$ can be calculated in similar manners.

Then, on the basis of the branch metrics calculated as described above, the path-metric calculating circuit 264 calculates:

$$L0(t-6)=\min[Li(t-8)+\lambda i0(t-6)]\ (i=0\ to\ 7)=0.81$$

Figure 29:
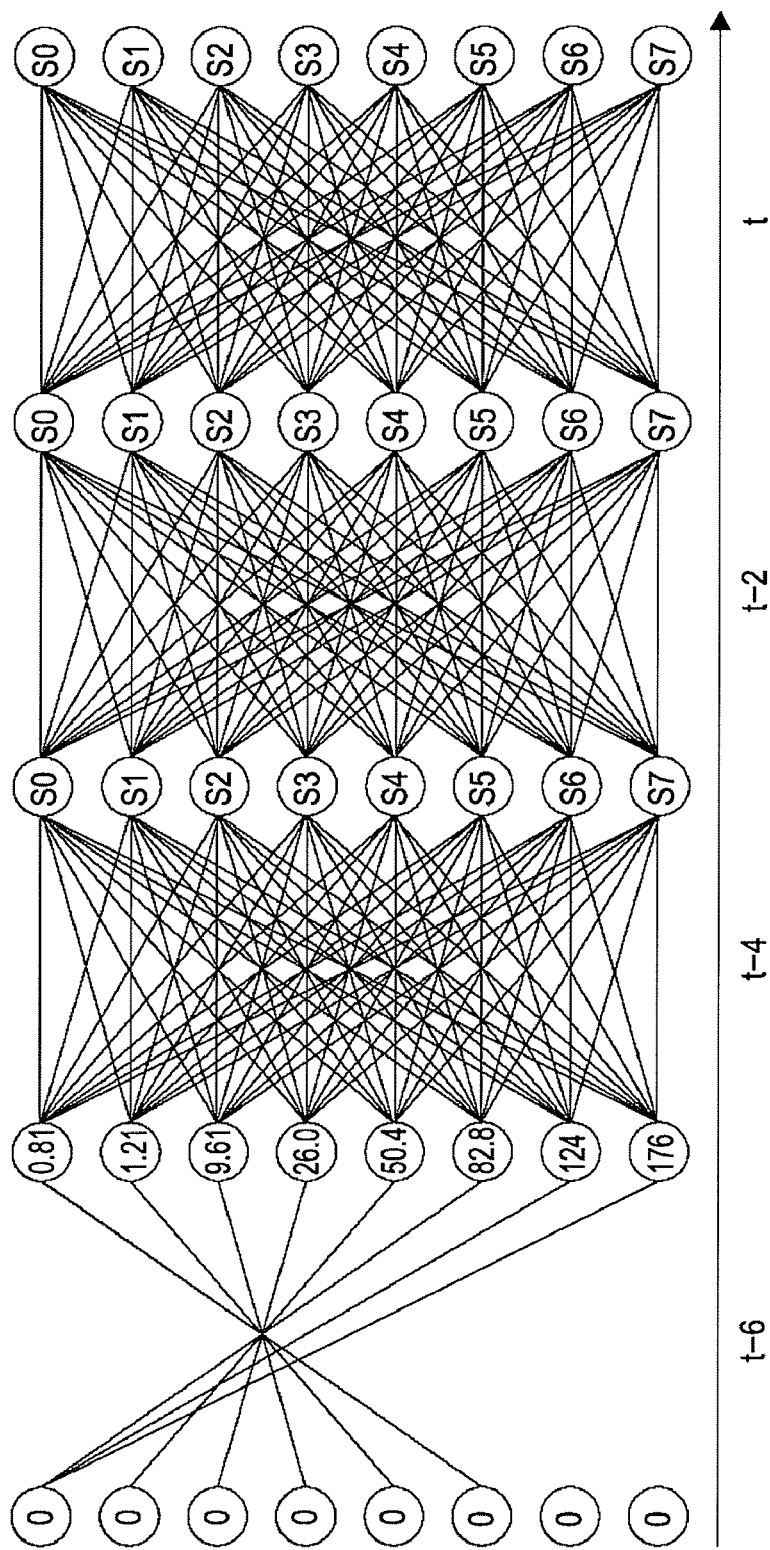
FIG. 29 is a trellis diagram showing results of calculation of path metrics in the second embodiment.

In this example, it is assumed that Li(t–8) is all 0 in the initial state. FIG. 29 shows the results of calculating other Lj(t–6) in a similar manner. As shown in FIG. 29, considering only the branches that are selected when calculating path metrics, the possible values of the first recorded multilevel data are narrowed down to 0 to 5.

Figure 30:
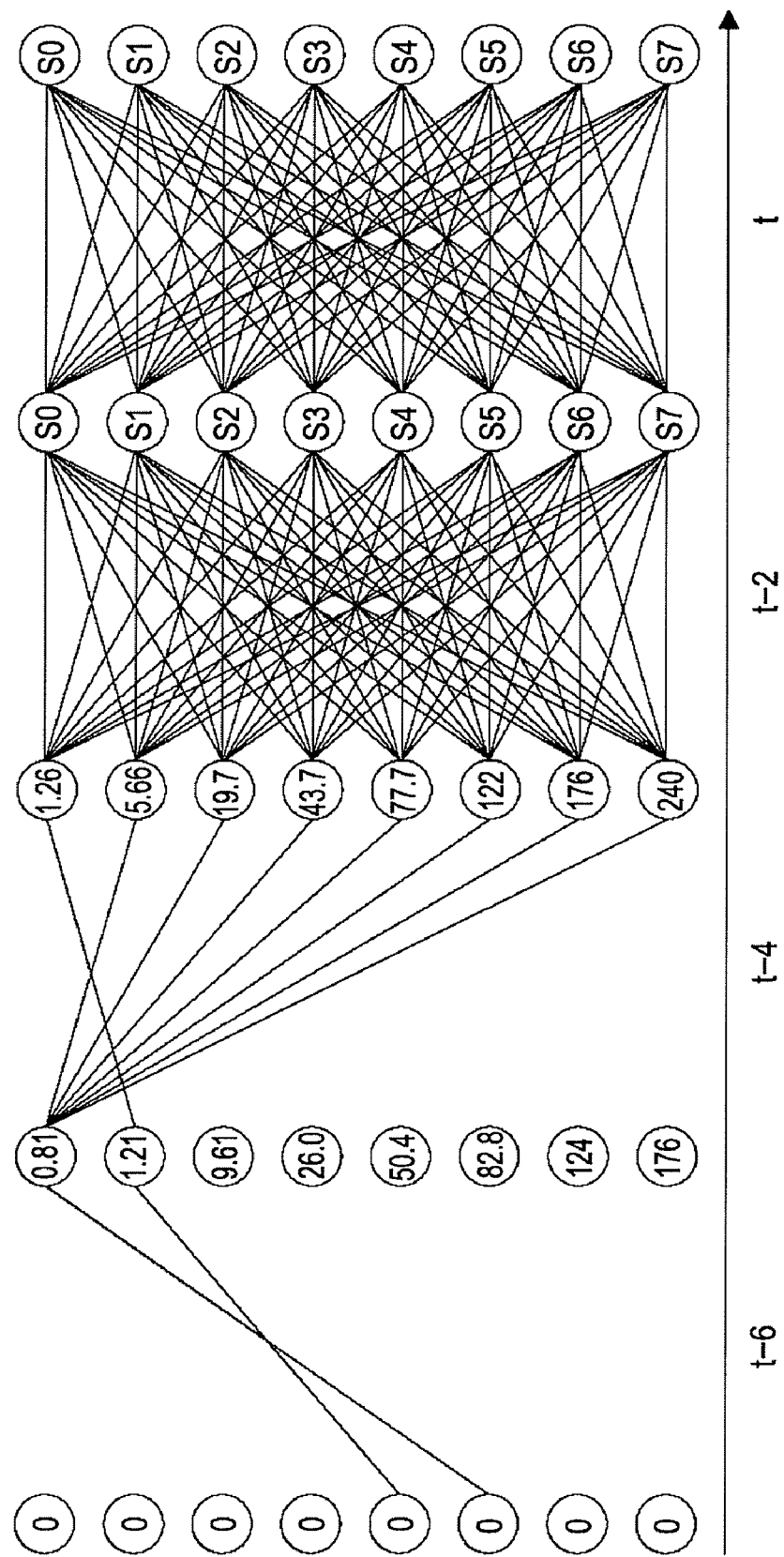
FIG. 30 is a trellis diagram showing results of calculation of path metrics in the second embodiment.

FIG. 30 shows the results of similarly calculating Lj(t–4). As shown in FIG. 30, considering only the survivor paths similarly to the above case, the possible values of decoded data are narrowed down to (4, 1, *, *, *) or (5, 0, *, *) (* denotes a value not yet determined).

Figure 31:
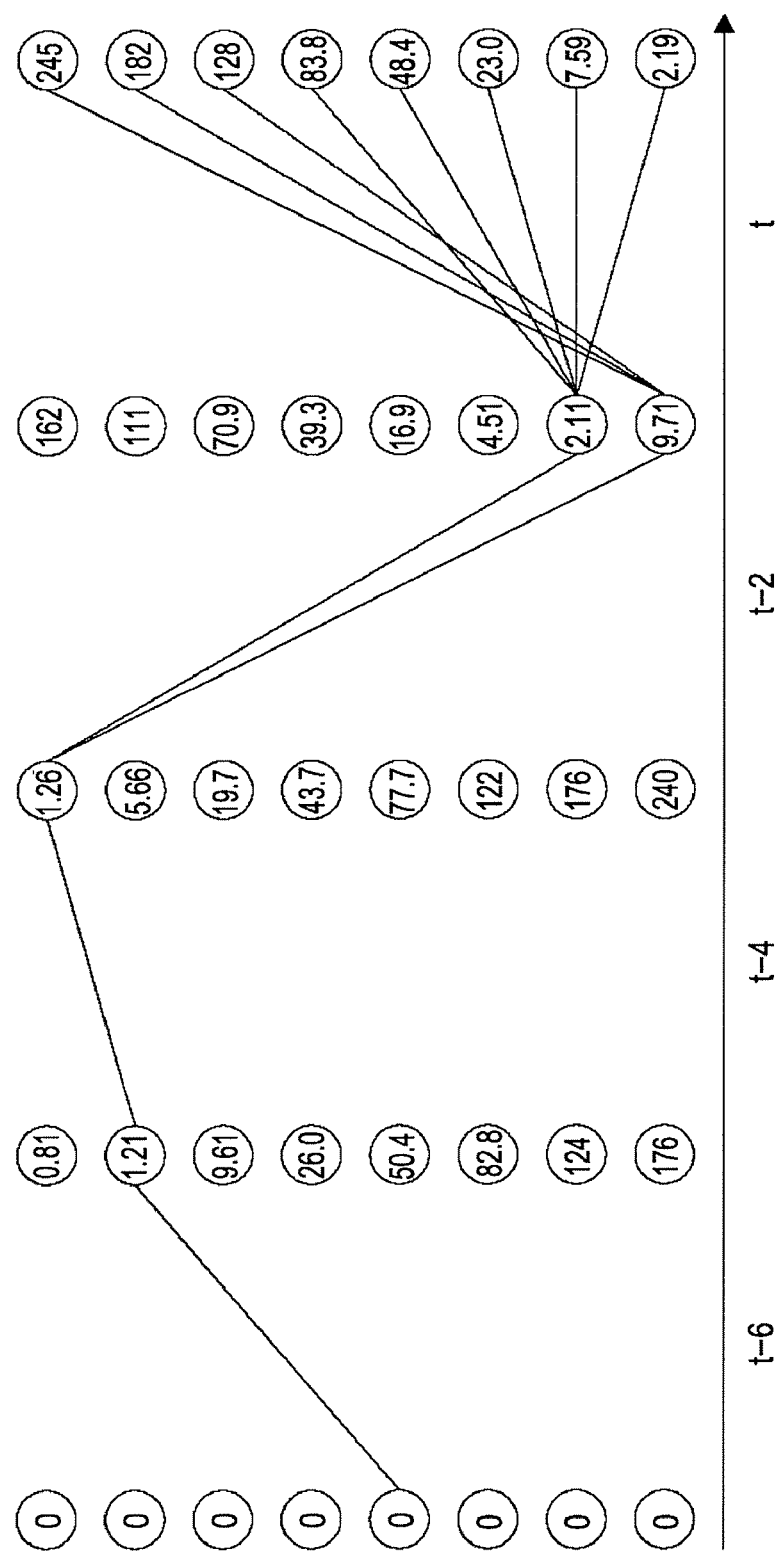
FIG. 31 is a trellis diagram showing results of calculation of path metrics in the second embodiment.

Furthermore, FIG. 31 shows the results of calculating Lj(t–2) and Lj(t) in similar manners. On the basis of the survivor path, the only possible values of multilevel data that is decoded is (4, 1, 0, *, *)

Finally, the minimum-path-memory selecting circuit 265 selects the state associated with the minimum path metric L7($t$)=2.19, whereby the first recorded data is decoded as 4. Subsequently, by calculating Lj(t) and Lj(t+2), the multilevel data is decoded as (4, 1, 0, *, *) in any case. Thus, the second symbol, which is decoded incorrectly in the case of level slicing, is decoded correctly.

Furthermore, when branch metrics are calculated as $\lambda ij(t)=(V(t)-sj)^2$ using only cell-center values, L0($t$) to L7($t$) take on the same values, so that the result of decoding is the same as that in the case of level slicing.

According to this embodiment, instead of determining multilevel information only on the basis of cell-center values sampled at cell centers as in the related art, multilevel information is determined on the basis of cell-boundary values sampled at cell boundaries as well as cell-center values. Accordingly, incorrect detection is reduced, so that high-density recording and reproduction of multilevel information is allowed.

The embodiment described above may be combined with the method of separation and detection described in the section of the related art.

Furthermore, although a cell-boundary value immediately preceding a cell-center value is selected at time t in the embodiment described above, alternatively, a cell-center value immediately preceding a cell-boundary value may be selected at time t.

In the method of separation and detection referred to herein, for example, signals reproduced from pit sequences in which the value of a subject information pit and the values of preceding and succeeding pits are known are read and stored. Then, signals reproduced from actual information pits are compared with the recorded values, thereby executing separation and detection.

The number of possible values of sj and the number of possible values of bi+j need not be 8 and 15, and may be 512 and 64 as in the case of si, j, k, bi, and j.

Furthermore, a Reed-Solomon code, or the like, may be used as an outer code for the purpose of error correction.

Third Embodiment

Now, a third embodiment of the present invention, which is a version in which the calculating circuits in the second embodiment are simplified, will be described in detail.

When multilevel information is recorded and reproduced, errors most frequently occur in adjacent symbols. Thus, it is possible to reduce errors by simply checking the parity of each cell as in the first embodiment.

Figure 32:
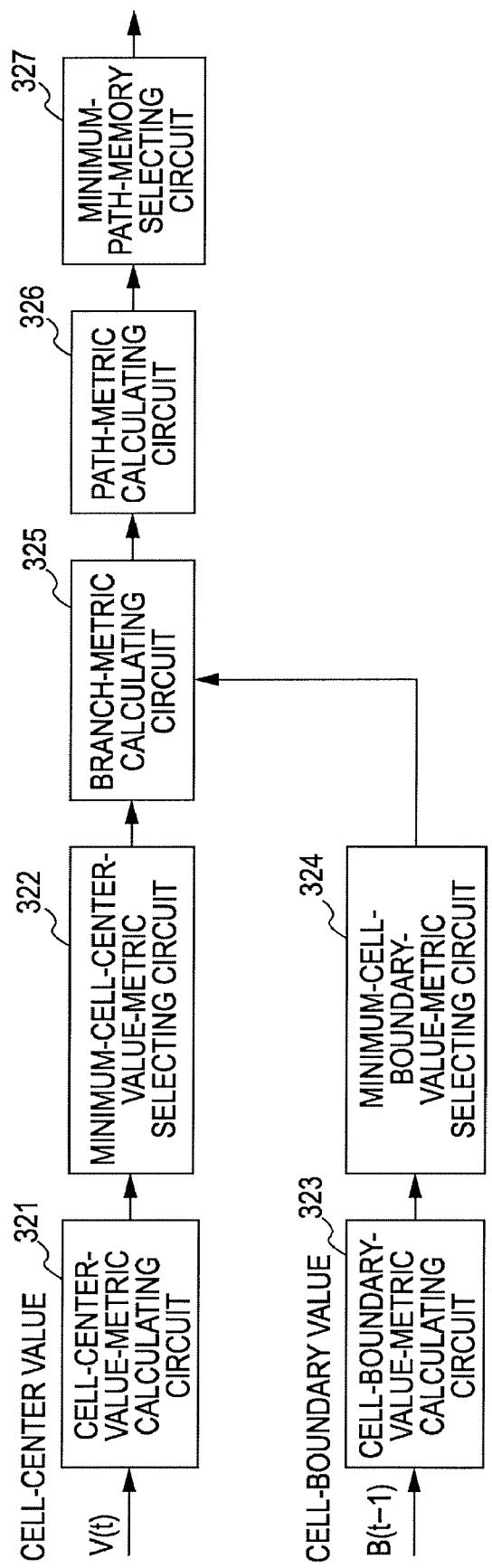
FIG. 32 is a block diagram showing the configuration of a multilevel-data determining circuit in a third embodiment of the present invention.

FIG. 32 shows the configuration of the multilevel-data determining circuit 15 in this embodiment. First, a cell-center-value-metric calculating circuit 321 and a minimum-cell-center-value-metric selecting circuit 322 perform calculations according to equations (6) and (7) below:

$$m\text{even}(t)=\min[(V(t)-sj)^2](j=0,2,4,6) \quad (6)$$

$$m\text{odd}(t)=\min[(V(t)-sj)^2](j=1,3,5,7) \quad (7)$$

where meven(t) and modd(t) denote a minimum cell-center-value metric at time t. The cell-center-value-metric calculating circuit 321 calculates $(V(t)-sj)^2$ (j=0 to 7), and the minimum-cell-center-value-metric selecting circuit 322 selects minimum values for even values and odd values of j.

Similarly, a cell-boundary-value-metric calculating circuit 323 and a minimum-cell-boundary-metric selecting circuit 324 select a minimum value for even values of j and a minimum value for odd values of j by performing calculations according to equations (8) and (9) below:

$$mb\text{even}(t-1)=\min[(B(t-1)-bi+j)^2](i+j=0,2,4,6,8,10,12,14) \quad (8)$$

$$mb\text{odd}(t-1)=\min[(B(t-1)-bi+j)^2](i+j=1,3,5,7,9,11,13) \quad (9)$$

Then, a branch-metric calculating circuit 325 calculates branch metrics according to equations (10) below:

$$\lambda 00(t)=m\text{even}(t)+mb\text{even}(t-1)$$

$$\lambda 01(t)=m\text{odd}(t)+mb\text{odd}(t-1)$$

$$\lambda 10(t)=m\text{even}(t)+mb\text{odd}(t-1)$$

$$\lambda 11(t)=m\text{odd}(t)+mb\text{even}(t-1) \quad (10)$$

Then, a path-metric calculating circuit 326 calculates path metrics Lj(t) according to equations (11) below:

$$L0(t)=\min[L0(t-2)+\lambda 00(t), L1(t-2)+\lambda 10(t)]$$

$$L1(t)=\min[L0(t-2)+\lambda 01(t), L1(t-2)+\lambda 11(t)] \quad (11)$$

where Lj(t) denotes a path metric of state 0 or state 1 at time t. In this example, only a path metric with a smaller value between transitions from state 0 and state 1 is selected, as expressed in equations (10).

Finally, a minimum-path-memory selecting circuit 327 selects a state having the minimum path metric to select a most likely path, and the parities of the multilevel data is checked.

The method of processing the branch metrics and path metrics described above will be described in detail with reference to FIGS. 33 and 34.

For the purpose of description, it is assumed herein that the recorded multilevel data is (4, 1, 0, 6, 7) and the parities thereof are (0, 1, 0, 0, 1).

Furthermore, similarly to the second embodiment, it is assumed herein that data after waveform equalization is as follows:

$$V(t-8)=0.8$$

$$V(t-6)=-6.1$$

$$V(t-4)=-7.2$$

$$V(t-2)=4.8$$

$$V(t)=7.2$$

$$B(t-7)=-2$$

$$B(t-5)=-6.1$$

$$B(t-3)=-1.9$$

$$B(t-1)=5.8$$

Furthermore, it is assumed that the reference values sj for cell-center values are s0=−7, s1=−5, s2=−3, s3=−1, s4=1, s5=3, s6=5, s7=7. Furthermore, it is assumed that the reference values bi+j for cell-boundary values are b0=−7, b1=−6, b2=−5, b3=−4, b4=−3, b5=−2, b6=−1, b7=0, b8=1, b9=2, b10=3, b11=4, b12=5, b13=6, b14=7.

When the cell-center values are decoded by level slicing the cell-center values by the reference values for cell-center values, the values of multilevel data are (4, 0, 0, 6, 7) and the parities thereof are (0, 0, 0, 0, 1), so that the second symbol is incorrect.

Figure 33:
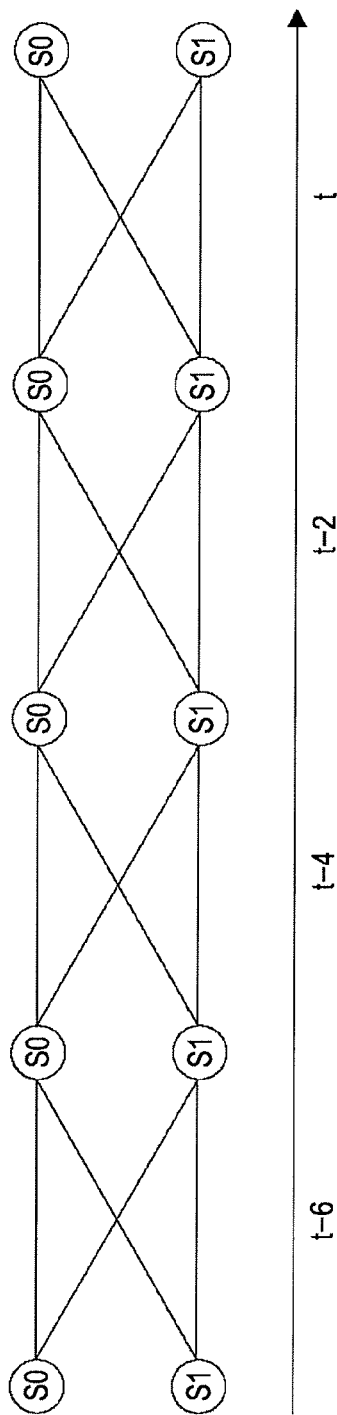
FIG. 33 is a trellis diagram of the multilevel-data determining circuit in the third embodiment.
Figure 34:
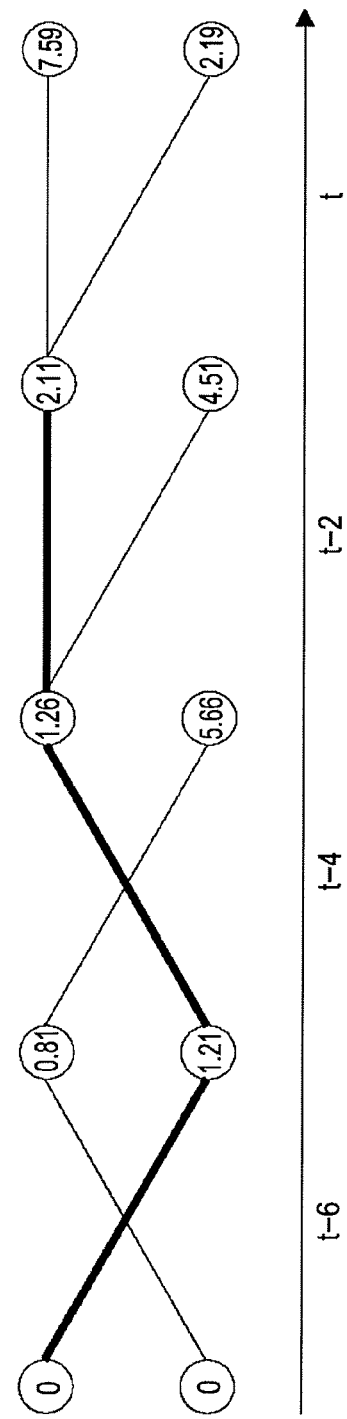
FIG. 34 is a trellis diagram showing results of calculation of path metrics by the multilevel-data determining circuit in the third embodiment.

FIG. 33 shows a trellis diagram of two states in this embodiment. The trellis diagram shown in FIG. 33 corresponds to the convolutional encoder shown in FIG. 24. In the trellis diagram, path metrics are shown in circles.

More specifically, the cell-center-value-metric calculating circuit 321 and the minimum-cell-center-metric selecting circuit 322 calculate the following cell-center-value metrics on the basis of individual reference values.

$$meven(t-6) = \min[(V(t-6)-sj)^2](j=0,2,4,6)$$
$$= ((-6.1)-(-7))^2$$
$$= 0.81 (j=0)$$

$$modd(t-6) = \min[(V(t-6)-sj)^2](j=1,3,5,7)$$
$$= ((-6.1)-(-5))^2$$
$$= 1.21 (j=1)$$

The value of j selected is used later when bits higher than the LSB are decoded.

Then, the cell-boundary-value-metric calculating circuit 323 and the minimum-cell-boundary-value-metric selecting circuit 324 calculate the following cell-boundary-value metrics on the basis of individual reference values.

$$mbeven(t-7) = \min[(B(t-7)-bi+j)^2]$$
$$(i+j=0,2,4,6,8,10,12,14)$$
$$= ((-2)-(-3))^2$$
$$= 1 (j=4)$$

$$mbodd(t-7) = \min[(B(t-7)-bi+j)^2]$$
$$(i+j=1,3,5,7,9,11,13)$$
$$= ((-2)-(-2))^2$$
$$= 0 (j=5)$$

Furthermore, on the basis of the metrics calculated as described above, the branch-metric calculating circuit 325 calculates branch metrics as follows:

$$\lambda 00(t-6)=meven(t-6)+mbeven(t-7)=1.81$$

$$\lambda 01(t-6)=modd(t-6)+mbodd(t-7)=1.21$$

$$\lambda 10(t-6)=meven(t-6)+mbodd(t-7)=0.81$$

$$\lambda 11(t-6)=modd(t-6)+mbeven(t-7)=2.21$$

Then, on the basis of the branch metrics calculated as described above, the path-metric calculating circuit 326 calculates path metrics L0(t−6) and L1(t−6) as follows:

$$L0(t-6)=\min[L0(t-8)+\lambda 00(t-6), L1(t-8)+\lambda 10(t-6)]=0.81$$

$$L1(t-6)=\min[L0(t-8)+\lambda 01(t-6), L1(t-8)+\lambda 11(t-6)]=1.21$$

In this example, L0(t−8) and L1(t−8) are 0 in the initial state.

FIG. 33 shows the values of L0(t−4), L1(t−4), L0(t−2), L1(t−2), L0(t), and L1(t) calculated in similar manners. Considering only the survivor path as shown in FIG. 34, the parities of decoded multilevel data are (0, 1, 0, 0, *) (* represents a value not yet determined).

As described above in detail, the number of states can be reduced to two by checking parities. This allows simplification of calculating circuits.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures and functions.

This application claims the benefit of Japanese Application No. 2006-017609 filed Jan. 26, 2006, Japanese Application No. 2006-112237 filed Apr. 14, 2006, and Japanese Application No. 2007-005580 filed Jan. 15, 2007, which are hereby incorporated by reference herein in their entirety.

What is claimed is:

1. A method of reproducing multilevel information using a light spot, the multilevel information being recorded by defining virtual cells at regular intervals on tracks of an optical information recording medium and varying sizes of information pits in the cells, the method comprising the steps of:

obtaining cell boundary values, each of the cell boundary values being obtained by performing sampling when the center of the light spot reaches a boundary between adjacent cells;

calculating cell boundary value metrics on the basis of the cell boundary values and prestored reference values for the cell boundary values;

calculating path metrics on the basis of the cell boundary value metrics;

selecting a path metric having a minimum value of the path metrics; and reproducing the multilevel information on the basis of the path metric having the minimum value of the path metrics, wherein the cell boundary value metrics are calculated as follows:

$$mb=(B1-b11)^2+(B2-b12)^2 \qquad (2)$$

(mb: cell boundary value metrics, B1: a value between a first cell and a second cell, the first cell, the second cell and a third cell being continuously disposed, B2: a value between the second cell and the third cell, and b11 and b12 are reference values), and wherein the path metrics are sequentially calculated while selecting a path having a minimum of cell boundary value metrics.

2. The method according to claim 1, wherein, in the step of calculating the cell boundary value metrics, with a plurality of successive cells being considered as a unit, possible values of individual cell boundary values are classified as even numbers or odd numbers, and in each combination of the even numbers and/or the odd numbers, metrics are calculated for the individual cell boundary values on the basis of the cell boundary values and the reference values associated with the combination, calculation is performed using the metrics of the cell boundaries, and a minimum value among results of the calculation is selected and output.

3. The method according to claim 1, further comprising the steps of:

calculating cell center value metrics on the basis of cell center values and prestored reference values for the cell center values, each of the cell center values being obtained by performing sampling when the light spot reaches the center of a cell; and calculating branch metrics on the basis of the cell center value metrics and the cell boundary value metrics associated with the cell center value metrics, wherein, in the step of calculating the path metrics, the path metrics are calculated on the basis of the branch metrics.

4. The method according to claim 3, wherein, in the step of calculating the cell center value metrics, with a plurality of cells being considered as a unit, possible values of the individual cell center values in the unit are classified as even numbers or odd numbers, and in each combination of the odd numbers and/or the even numbers, metrics are calculated for the individual cell center values on the basis of the cell center values and the reference values associated with the combination, calculation is performed using the metrics of the cell centers, and a minimum value among results of the calculation is selected and output.

5. The method according to claim 3, wherein the cell boundary value metric associated with the cell center value metric is calculated on the basis of either one of the cell boundary values sampled at the cell boundaries of the cell having the cell center associated with the cell center value metric, which is calculated on the basis of the cell center value sampled at the cell center.

6. An apparatus for reproducing multilevel information using a light spot, the multilevel information being recorded by defining cells at regular intervals on tracks of an optical information recording medium and varying sizes of information pits in the cells, the apparatus comprising:

an optical head with a photodetector, the optical head producing a light spot; and a multilevel data determining circuit, wherein said multilevel data determining circuit (i) obtains cell boundary values, each of the cell boundary values being obtained by performing sampling when the center of the light spot reaches a boundary between adjacent cells, (ii) calculates cell boundary value metrics on the basis of the cell boundary values and prestored reference values for the cell boundary values, (iii) calculates path metrics on the basis of the cell boundary value metrics, (iv) selects a path metric having a minimum value of the path metrics, and (v) reproduces the multilevel information on the basis of the path metric having the minimum value of the path metrics, wherein the cell boundary metrics are calculated as follows:

$$mb=(B1-b11)^2+(B2-b12)^2 \qquad (2)$$

(mb: cell boundary value metrics, B1: a value between a first cell and a second cell, the first cell, the second cell and a third cell being continuously disposed, B2: a value between the second cell and the third cell, and b11 and b12 are reference values), and wherein the path metrics are sequentially calculated while selecting a path having a minimum of cell boundary value metrics.

7. An apparatus according to claim 6, wherein said multilevel data determining circuit calculates the cell boundary value metrics with a plurality of successive cells considered as a unit, possible values of individual cell boundary values are classified as even numbers or odd numbers, and in each combination of the even numbers and/or the odd numbers, said multilevel data determining circuit calculates metrics for the individual cell boundary values on the basis of the cell boundary values and the reference values associated with the combination, the calculation being performed using the metrics of the cell boundaries, said multilevel data determining circuit further selecting and outputting a minimum value among the results of the calculation.

8. The apparatus according to claim 6, wherein said multilevel data determining circuit further calculates cell center value metrics on the basis of cell center values and prestored reference values for the cell center values, each of the cell center values being obtained by performing sampling when the light spot reaches the center of a cell, and wherein said multilevel data determining circuit calculates branch metrics on the basis of the cell center value metrics and the cell boundary value metrics associated with the cell center value metrics.

9. An apparatus according to claim 8, wherein said multilevel data determining circuit calculates the cell center value metrics with a plurality of successive cells considered as a unit, possible values of individual cell center values in the unit are classified as even numbers or odd numbers, and in each combination of the even numbers and/or the odd numbers, said multilevel data determining circuit calculates metrics for the individual cell center values on the basis of the cell center values and the reference values associated with the combination, the calculation being performed using the metrics of the cell centers, said multilevel data determining circuit further selecting and outputting a minimum value among the results of the calculation.

10. The apparatus according to claim 8, wherein the cell boundary value metric associated with the cell center value metric is calculated by said multilevel data determining circuit on the basis of either one of the cell boundary values sampled at the cell boundaries of the cell having the cell center associated with the cell center value metric, which is calculated on the basis of the cell center value sampled at the cell center.

11. The apparatus according to claim 6, wherein said optical head records the multilevel information on the optical information recording medium.

12. An apparatus for reproducing multilevel information using a light spot, the multilevel information being recorded by defining cells at regular intervals on tracks of an optical information recording medium and varying sizes of information pits in the cells, the apparatus comprising:
    means for obtaining cell boundary values based on a sampling when the center of the light spot reaches a boundary between adjacent cells;
    means for calculating cell boundary value metrics on the basis of the cell boundary values and prestored reference values for cell boundary values;
    means for calculating path metrics on the basis of the cell boundary value metrics;
    means for selecting a path metric having a minimum value of the path metrics; and
    means for reproducing the multilevel information on the basis of the path metric having the minimum value of the path metrics, wherein the cell boundary metrics are calculated as follows:

$$mb = (B1 - b11)^2 + (B2 - b12)^2 \quad (2)$$

(mb: cell boundary value metrics, B1: a value between a first cell and a second cell, the first cell, the second cell and a third cell being continuously disposed, B2: a value between the second cell and the third cell, and b11 and b12 are reference values), and wherein the path metrics are sequentially calculated while selecting a path having a minimum of cell boundary value metrics.

13. The apparatus according to claim 12, wherein said means for calculating cell boundary metrics uses a plurality of successive cells being considered as a unit, possible values of individual cell boundary values are classified as even numbers or odd numbers, and in each combination of the even numbers and/or the odd numbers, said means for calculating cell boundary metrics calculates metrics for the individual cell boundary values on the basis of the cell boundary values and the reference values associated with the combination, the calculation being performed using the metrics of the cell boundaries, and said means for calculating cell boundary metrics further selects and outputs a minimum value among the results of the calculation.

14. The apparatus according to claim 12, further comprising:
    means for calculating cell center value metrics on the basis of cell center values and prestored reference values for the cell center values;
    means for calculating branch metrics on the basis of the cell center value metrics and cell boundary value metrics associated with the cell center value metrics; and
    means for calculating path metrics on the basis of the branch metrics.

15. The apparatus according to claim 14, wherein said means for calculating cell center value metrics uses a plurality of successive cells considered as a unit, possible values of individual cell center values are classified as even numbers or odd numbers, and in each combination of the even numbers and/or the odd numbers, said means for calculating cell center value metrics calculates metrics for the individual cell center values on the basis of the cell center values and the reference values associated with the combination, the calculation being performed using the metrics of the cell center, and said means for calculating cell center value metrics further selects and outputs a minimum value among the results of the calculation.

16. The apparatus according to claim 14, wherein the cell boundary value metric associated with the cell center value metric is calculated by said means for calculating cell boundary value metrics on the basis of either one of the cell boundary values sampled at the cell boundaries of the cell having the cell center associated with the cell center value metric, which is calculated on the basis of the cell center value sampled at the cell center.

17. The apparatus according to claim 12, further comprising means for recording the multilevel information on an optical information recording medium.

* * * * *